United States Patent
Kuusela et al.

(10) Patent No.: US 10,609,421 B2
(45) Date of Patent: Mar. 31, 2020

(54) CONTEXT DERIVATION FOR COEFFICIENT CODING

(71) Applicant: Google LLC, Mountain View, CA (US)

(72) Inventors: Aki Kuusela, Palo Alto, CA (US); Dake He, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 56 days.

(21) Appl. No.: 16/033,582

(22) Filed: Jul. 12, 2018

(65) Prior Publication Data

US 2020/0021855 A1    Jan. 16, 2020

(51) Int. Cl.
*H04N 19/91* (2014.01)
*H04N 19/124* (2014.01)
*H04N 19/176* (2014.01)
*H04N 19/625* (2014.01)

(52) U.S. Cl.
CPC ........... *H04N 19/91* (2014.11); *H04N 19/124* (2014.11); *H04N 19/176* (2014.11); *H04N 19/625* (2014.11)

(58) Field of Classification Search
None
See application file for complete search history.

(56) References Cited

U.S. PATENT DOCUMENTS

| | | | |
|---|---|---|---|
| 6,990,247 B2 | 1/2006 | Schwartz | |
| 7,535,387 B1 | 5/2009 | Delva | |
| 7,573,405 B2 | 8/2009 | Shima | |
| 7,573,407 B2 | 8/2009 | Reznik | |
| 7,982,641 B1 | 7/2011 | Su et al. | |
| 8,004,431 B2 | 8/2011 | Reznik | |
| 2007/0285287 A1 | 12/2007 | Hussain et al. | |
| 2008/0111721 A1 | 5/2008 | Reznik | |

(Continued)

FOREIGN PATENT DOCUMENTS

| | | |
|---|---|---|
| WO | 2011/138584 A1 | 11/2011 |
| WO | 2013/130952 A1 | 9/2013 |

OTHER PUBLICATIONS

Bankoski, et al., "Technical Overview of VP8, an Open Source Video Codec for the Web", Jul. 11, 2011, 6 pp.

(Continued)

*Primary Examiner* — Michael J Hess
(74) *Attorney, Agent, or Firm* — Young Basile Hanlon & MacFarlane, P.C.

(57) ABSTRACT

Coding a transform block having transform coefficients is described. A plurality of register arrays is defined to each hold one or more stored values regarding the coding context based on at least one spatial template for a coding context. The register arrays are initialized by setting the stored values to default values, and values for the transform coefficients from the transform block are coded in a reverse scan order. The values for the transform coefficients are indicative of magnitudes of the transform coefficients. For each of one or more transform coefficients, the coding includes determining the coding context using at least some of the stored values from the register arrays, entropy coding a value for the transform coefficient using the coding context, and updating the register arrays subsequent to entropy coding the value for the transform coefficient.

19 Claims, 15 Drawing Sheets

POSITION OF VALUE BEING CODED

SECOND REGISTER ARRAY

FIRST REGISTER ARRAY

(56) References Cited

U.S. PATENT DOCUMENTS

| | | |
|---|---|---|
| 2008/0162911 A1 | 7/2008 | Vaithianathan |
| 2008/0240233 A1 | 10/2008 | Au et al. |
| 2009/0224950 A1 | 9/2009 | Xu |
| 2011/0137645 A1 | 6/2011 | Vary et al. |
| 2011/0200104 A1 | 8/2011 | Korodi et al. |
| 2013/0028334 A1 | 1/2013 | Bossen |
| 2014/0140400 A1* | 5/2014 | George .............. H04N 19/174 375/240.12 |
| 2014/0286417 A1 | 9/2014 | Gamei et al. |
| 2016/0286215 A1 | 9/2016 | Gamei et al. |
| 2018/0352230 A1* | 12/2018 | He ...................... H04N 19/182 |
| 2018/0367795 A1* | 12/2018 | Ji ........................ H04N 19/51 |
| 2019/0182507 A1* | 6/2019 | Kuusela .............. H04N 19/60 |

OTHER PUBLICATIONS

Bankoski et al., "VP8 Data Format and Decoding Guide", Independent Submission RFC 6389, Nov. 2011, 305 pp.

Bankoski et al, "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

International Search Report and Written Opinion in PCT/US2018/051041, dated Jan. 2, 2019, 15 pgs.

Hao-Chieh Chang et al., "Efficient algorithms and architectures for MPEG-4 object-based video coding", 2000 IEEE Workshop on Signal Processing Systems (SIPS), Oct. 11-13, 2000 (Piscataway, NJ), pp. 13-22.

Rajan Joshi et al., "AHG19: Modifications to HE transform coefficient coding for transform skip mode", Joint Collaborative Team on Video Coding (VCT-VC) of ITU-T SG16 WP3 and ISO/IEC JTC1/SC29/WG11, 7th Meeting, Geneva, CH, Nov. 21-30, 2011; http://wftp3.itu.int/av-arch/jctvc-site/, Document No. JCTVC-G663 (Nov. 9, 2011), 3 pgs.

T-H Tsai et al., "VLSI design for MPEG-4 shape coding using a contour-based binary motion estimation algorithm", IET Circuits, Devices & Systems, vol. 2, No. 5, Oct. 16, 2008, pp. 429-438.

T. Nguyen et al., "Non-CE11: Proposed Cleanup for Transform Coefficient Coding", Joint Collaborative Team on Video Coding (JCT-VC) of ITU-T SG16 WP3 and ISO/IEC JTC1/SC29/WG11, 8th Meeting, San Jose, CA, Feb. 1-10, 2012, http://wftp3.itu.int/av-arch/jctvc-site/, Document No. JCTVC-H0228 (Jan. 20, 2012), 6 pgs.

\* cited by examiner

FIG. 7

CONTEXT DERIVATION FOR COEFFICIENT CODING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

One aspect of the disclosed implementations is a method of coding a transform block having transform coefficients. The method includes defining, based on at least one spatial template for a coding context, register arrays to each hold one or more stored values regarding the coding context, wherein the register arrays include at least a first register array that has a first size and a second register array that has a second size that is different than the first size, initializing the register arrays by setting the stored values to default values, and coding, in a reverse scan order, values for the transform coefficients from the transform block that are indicative of magnitudes of the transform coefficients. The coding includes, for each of one or more transform coefficients, determining the coding context using at least some of the stored values from the register arrays, entropy coding a value for the transform coefficient at a scan position using the coding context, and, subsequent to entropy coding the value for the transform coefficient, updating the register arrays.

Another aspect of the disclosed implementations is an apparatus for coding a transform block having transform coefficients. The apparatus includes a memory and a processor configured to execute instructions stored in the memory. The instructions, when executed, cause the processor to define, based on at least one spatial template for a coding context, register arrays to each hold one or more stored values regarding the coding context, wherein the register arrays include at least a first register array that has a first size and a second register array that has a second size that is different than the first size, initialize the register arrays by setting the stored values to default values, and code, in a reverse scan order, values for the transform coefficients from the transform block that are indicative of magnitudes of the transform coefficients. The instructions to code include instructions to, for each of one or more transform coefficients, determine the coding context using at least some of the stored values from the register arrays, entropy code a value for the transform coefficient at a scan position using the coding context, and update the register arrays subsequent to entropy coding the value for the transform coefficient.

Another apparatus for coding a transform block having transform coefficients that includes a memory and a processor configured to execute instructions stored in the memory is described. The instructions, when executed, cause the processor to define, based on at least one spatial template for a coding context, register arrays to each hold one or more stored values regarding the coding context, initialize the register arrays by setting the stored values to default values, and code values, in a reverse scan order, for the transform coefficients of the transform block indicative of magnitudes of the transform coefficients. The coding instructions includes instructions to determine a first coding context using at least some of the stored values from the register arrays, entropy code a first value for the transform coefficient using the first coding context, the first value indicative of a magnitude of the transform coefficient, and the first value belonging to a set of positive integers $\{0, \ldots, \text{a first maximum value}\}$, determine a second coding context using at least some of the stored values from the register arrays, entropy code a second value for the transform coefficient using the second coding context, the second value indicative of the magnitude of the transform coefficient, the second value belonging to a set of positive integers $\{0, \ldots, \text{a second maximum value}\}$, and the second maximum value greater than the first maximum value, and, subsequent to entropy coding the first value and the second value, update the register arrays.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

FIG. 7 is a diagram illustrating the stages of transform coefficient coding using level maps in accordance with implementations of this disclosure.

DETAILED DESCRIPTION

Figure 1:
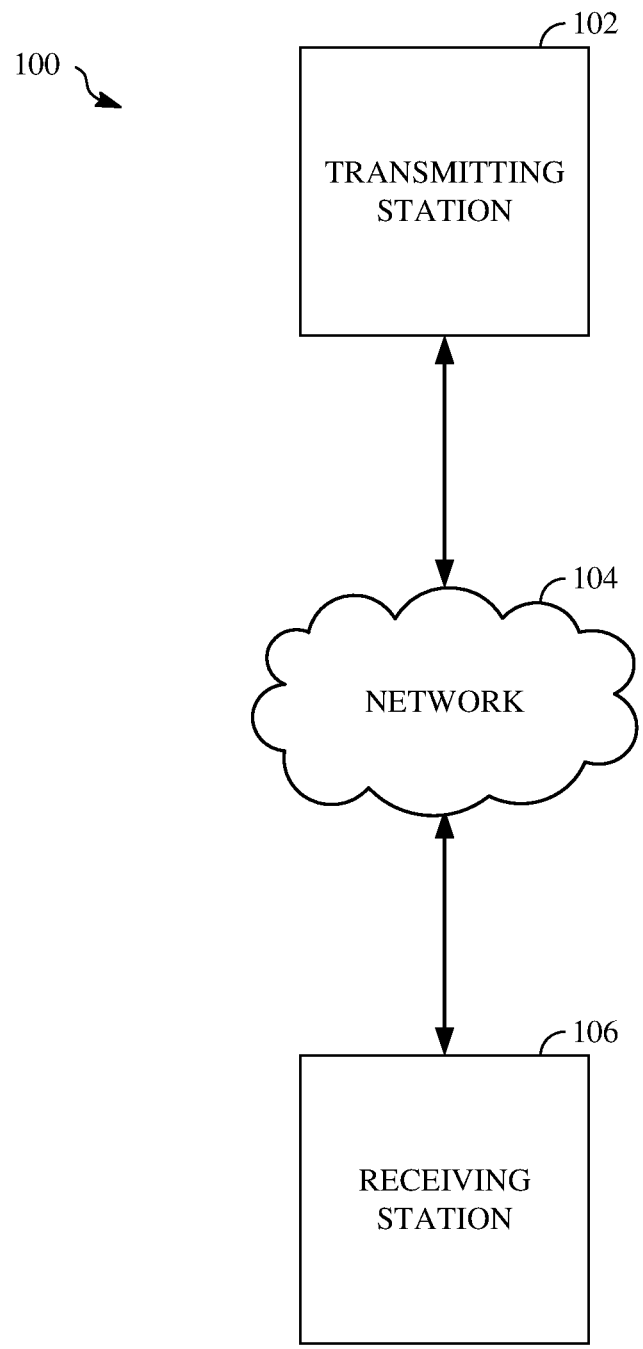
FIG. 1 is a schematic of a video encoding and decoding system.

As mentioned above, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Intra prediction attempts to predict the pixel values of a block of a frame of video using pixels peripheral to the block; that is, using pixels that are in the same frame as the block but that are outside the block. A prediction block resulting from intra prediction is referred to herein as an intra predictor. Intra prediction can be performed along a direction of prediction where each direction can correspond to an intra prediction mode. The intra prediction mode can be signaled by an encoder to a decoder.

Encoding using temporal similarities can be known as inter prediction. Inter prediction attempts to predict the pixel values of a block using a possibly displaced block or blocks from a temporally nearby frame (i.e., reference frame) or frames. The displacement is identified by a motion vector. A temporally nearby frame is a frame that appears earlier or later in time in the video stream than the frame of the block being encoded. Some codecs use up to eight reference frames, which can be stored in a frame buffer. The motion vector can refer to (i.e., use) one of the reference frames of the frame buffer. As such, one or more reference frames can be available for coding a current frame. A prediction block resulting from inter prediction is referred to herein as inter predictor.

As mentioned above, a current block of a video stream may be encoded based on identifying a difference (residual) between the previously coded pixel values and those in the current block. In this way, only the residual and parameters used to generate the residual need be added to the encoded bitstream. The residual may be encoded using a lossy quantization step.

The residual block can be in the pixel domain. The residual block can be transformed into a transform domain, resulting in a transform block of transform coefficients.

Herein, the frequency domain is utilized as an example of the transform domain, but should be construed to refer generally to the domain in which the values are expressed after being transformed, including by Discrete Cosine Transform (DCT) and its variants, Discrete Sine Transform (DST) and its variants, and identity transform or its scaled variants.

The transform coefficients can be quantized resulting in a quantized transform block of quantized transform coefficients. The quantized coefficients can be entropy encoded and added to an encoded bitstream. A decoder can receive the encoded bitstream and entropy decode the quantized transform coefficients to reconstruct the original video frame.

Entropy coding is a technique for "lossless" coding that relies upon probability models that model the distribution of values occurring in an encoded video bitstream. By using probability models based on a measured or estimated distribution of values, entropy coding can reduce the number of bits required to represent video data close to a theoretical minimum. In practice, the actual reduction in the number of bits required to represent video data can be a function of the accuracy of the probability model, the number of bits over which the coding is performed, and the computational accuracy of fixed-point arithmetic used to perform the coding.

In an encoded video bitstream, many of the bits are used for one of two things: either content prediction (e.g., inter mode/motion vector coding, intra prediction mode coding, etc.) or residual coding (e.g., transform coefficient coding).

With respect to content prediction, the bits in the bitstream can include, for a block, the intra prediction mode used to encode the block. The intra prediction mode can be coded (encoded by an encoder and decoded by a decoder) using entropy coding. As such, a context is determined for the intra prediction mode and a probability model, corresponding to the context, is used for coding the intra prediction mode.

Entropy coding a sequence of symbols is typically achieved by using a probability model to determine a probability for the sequence and then using binary arithmetic coding to map the sequence to a binary codeword at the encoder and to decode that sequence from the binary codeword at the decoder.

A context model, as used herein, can be a parameter in entropy coding. A context model can be any parameter or method that affects probability estimation for entropy coding. A purpose of context modeling is to obtain probability distributions for a subsequent entropy coding engine, such as arithmetic coding, Huffman coding, and other variable-length-to-variable-length coding engines. To achieve good compression performance, a large number of contexts may be required. For example, some video coding systems can include hundreds or even thousands of contexts for transform coefficient coding alone. Each context can correspond to a probability distribution.

Residual coding involves transforming residuals for a block of video into transform blocks of transform coefficients. The transform blocks are in the frequency domain, and one or more transform blocks may be generated for a block of video. The transform coefficients are quantized and entropy coded into an encoded video bitstream. A decoder uses the encoded transform coefficients and the reference frames to reconstruct the block. Entropy coding a transform coefficient involves the selection of a context model (also referred to as probability context model or probability model) that provides estimates of conditional probabilities for coding the binary symbols of a binarized transform coefficient.

In the implementations of template-based entropy coding of quantized transform coefficients that are described herein, spatial templates are used during entropy coding to select context neighbors of the value being coded, and the context neighbors are used to determine the coding context. Accessing the values needed for determining the coding context can, however, lead to memory bottlenecks. In the implementations described herein, the values needed for determining the coding context are held in register arrays within memory, and at least some values therein are updated using the most recently coded value, which reduces the amount of information that must be obtained from base information such as the transform block or level maps. In some embodiments, these register arrays may be organized into one or more register sets, where the lengths of the arrays (i.e., the number of elements or stored context neighbor values) may be different. A register array may comprise a shift register or any other memory where values may be shifted within and/or between arrays.

Template-based entropy coding of quantized transform coefficients is described herein first with reference to a system in which the teachings may be incorporated.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
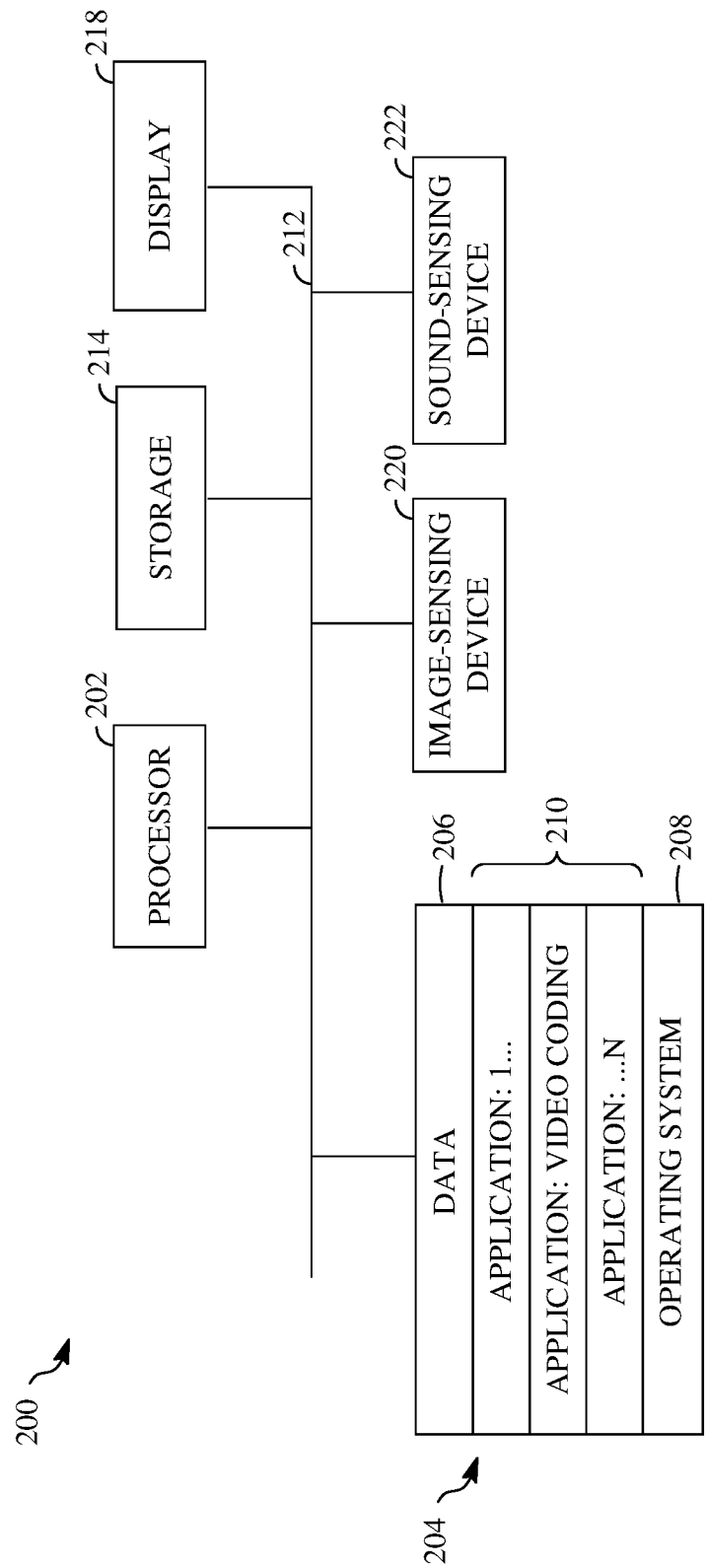
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
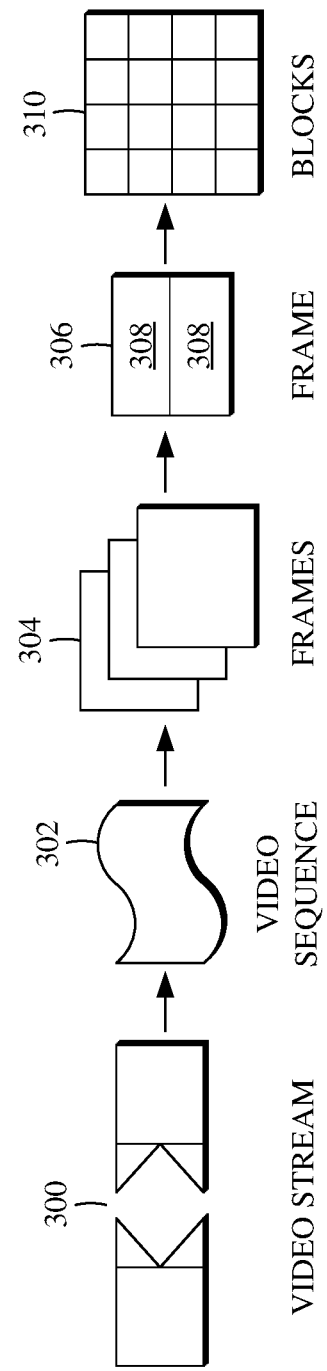
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
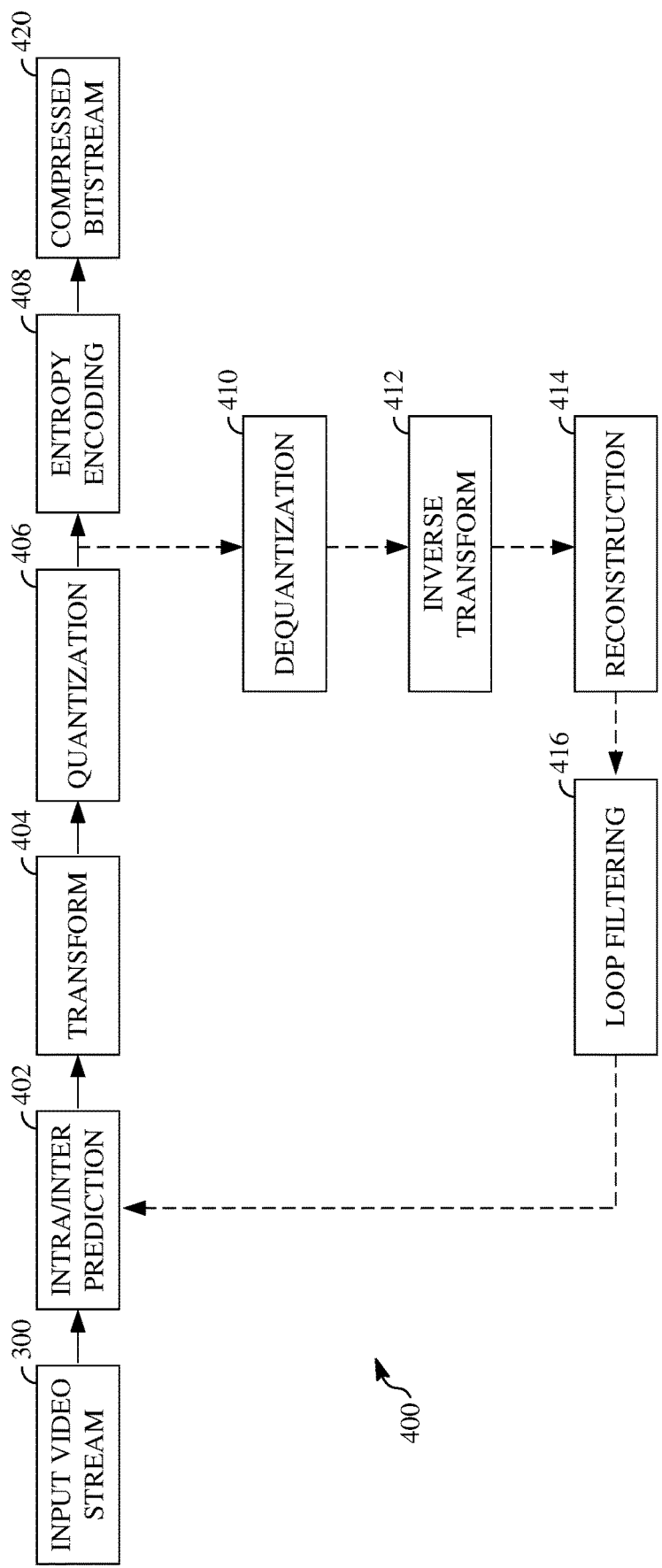
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the DCT and the Asymmetric DST. Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient is located at the top-left of the matrix and the highest frequency coefficient is located at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
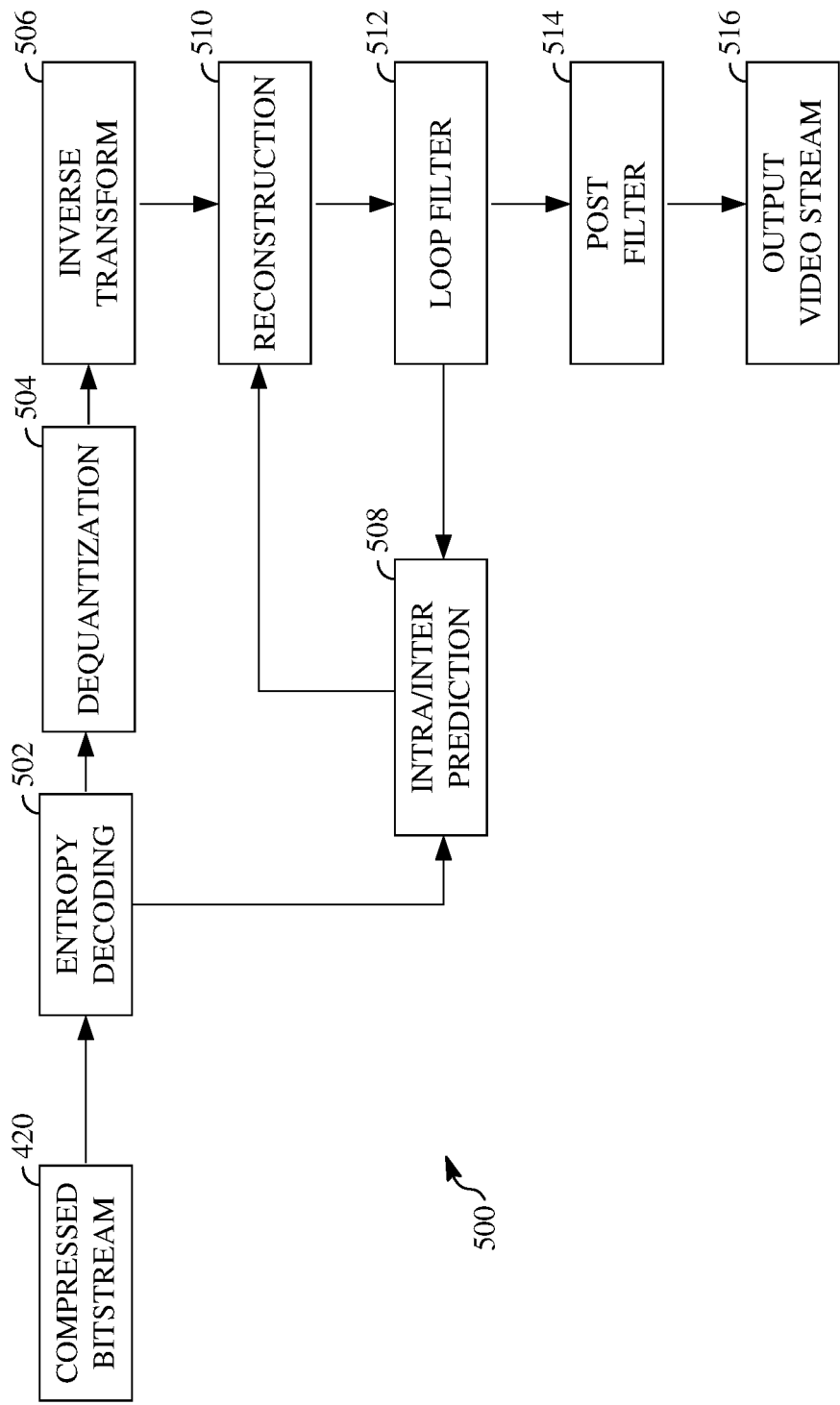
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manners described below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied before the loop filtering stage 512. Additionally, or alternatively, the encoder 400 includes a deblocking filtering stage in addition to the loop filtering stage 416.

In the encoder 400 and the decoder 500, blocks of transform coefficients may be determined by transforming residual values according to a transform type. A transform type may be one or more one-dimensional transform types, including a one-dimensional horizontal transform type, referred to herein as TX_CLASS_HORIZ, where identity transform is applied to columns, or a one-dimensional vertical transform type, referred to herein as TX_CLASS_VERT, where identity transform is applied to rows. In a one-dimensional horizontal transform type, identity transform is applied to columns. Similarly, in a one-dimensional vertical transform type, identity transform is applied to rows. A transform type may also be a two-dimensional transform type, referred to herein as TX_CLASS_2D. Whichever transform type is selected is used to transform the residual values into the frequency domain during encoding and to inverse-transform from the frequency domain during decoding. As previously described, the transform coefficients may be quantized.

The quantized transform coefficients may be represented using level maps and encoded or decoded using context-based arithmetic coding methods. These coding and operations are performed, for example, in the entropy encoding stage 408 of the encoder 400 and the entropy decoding stage 502 of the decoder 500. Context-based arithmetic coding methods code values using a probability model that is selected based on a coding context or simply a context. The coding context includes values that are within a spatial area near the value being coded. Selecting the probability model based on the coding context allows for better modelling of probabilities given that a high level of correlation between coding modes is typically present in a given spatial area. When coding a transform value from a block, the context is determined based on a template. The template may be selected based on the transform type.

In level map coding, the transform block is decomposed into multiple level maps such that the level maps break down (i.e., reduce) the coding of each transform coefficient value into a series of binary decisions each corresponding to a magnitude level (i.e., a map level). The decomposition can be done by using a multi-run process. As such, a transform coefficient of the transform block is decomposed into a series of level maps, which may be level binaries, and a residue according to the equation:

$$\text{coefficient}[r][c] = \left\{\left(\sum_{k=0}^{T} \text{level}_k[r][c]\right) + \text{residue}[r][c]\right\} * \text{sign}[r][c]$$

Where
residue [r][c]=absolute(coefficient [r][c])−T−1; and $$\text{sign}[r][c] = \begin{cases} 1 & \text{if coefficient } [r][c] > 0 \\ -1 & \text{if coefficient } [r][c] < 0 \end{cases}.$$

In the above equation, coefficient[r][c] is the transform coefficient of the transform block at the position (row=r, column=c), T is the maximum map level, $\text{level}_k$ is the level map corresponding to map level k, residue is a coefficient residual map, and sign is the sign map of the transform coefficients. The transform coefficients of a transform block can be re-composed using the same equation, such as by a decoder, from encoded level$_k$ maps, residual map residue, and sign map sign. Level map coding will be explained further with reference to FIGS. 6 and 7.

Figure 6:
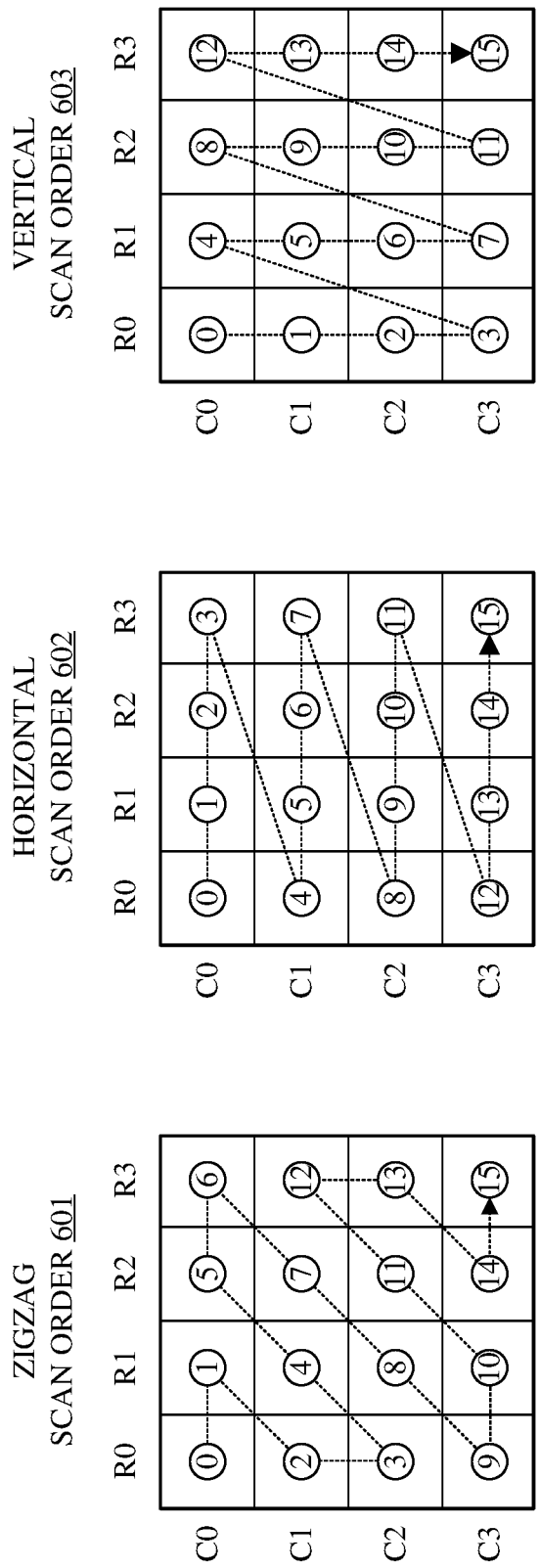
FIG. 6 is a diagram showing scan orders that can be utilized when coding a block of transform coefficients in accordance with implementations of this disclosure.

FIG. 6 is a diagram showing scan orders that can be utilized when coding a block of transform coefficients in accordance with implementations of this disclosure. The scan orders include a zig-zag scan order 601, a horizontal scan order 602, and a vertical scan order 603. In the illustrated example the blocks are 4×4 blocks that each include 16 values. Each has four rows, labelled R0-R3 in left-to-right order, and four columns, labelled C0-C3 in top-to-bottom order. Individual locations in each block correspond to individual transform coefficients, and can be addressed in the format [r, c], where r represents the row number and c represents the column number. Each of the zig-zag scan order 601, the horizontal scan order 602, and the vertical scan order 603 starts at position [0, 0], and the numbers shown indicate the order in which locations in the block are visited/processed subsequent to position [0, 0], according to the scan order. The zig-zag scan order 601 visits locations in the block along diagonals, proceeding in a left-to-right and top-to-bottom manner. The horizontal scan order 602 proceeds left-to-right along each row before proceeding to the next row in top-to-bottom order. The vertical scan order 603 proceeds top-to-bottom along each column before proceeding to the next column in left-to-right order.

Figure 7:
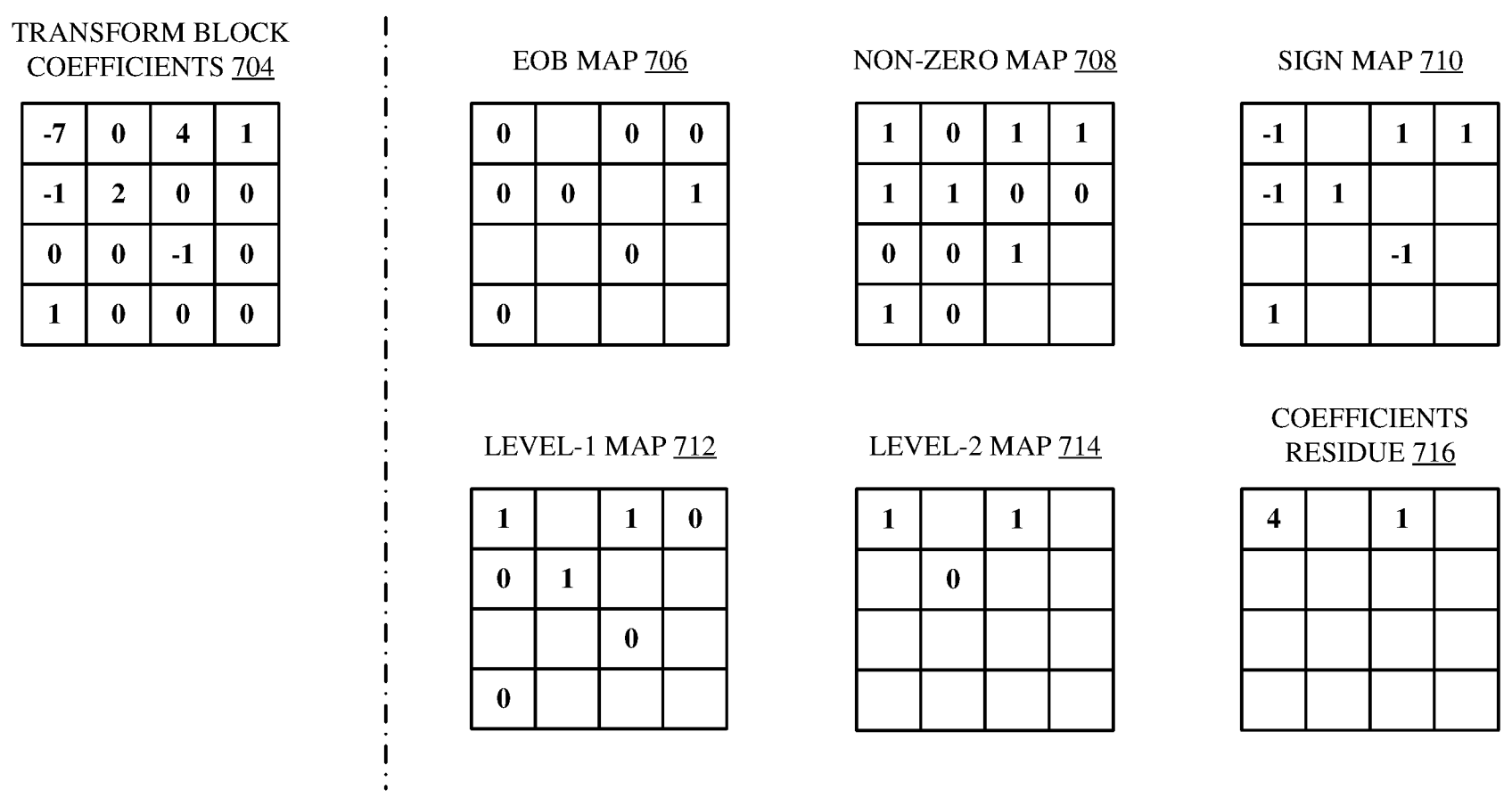

FIG. 7 is a diagram illustrating the stages of transform coefficient coding using level maps in accordance with implementations of this disclosure. FIG. 7 shows a transform block 704 and level maps that represent the transform block, including an end-of-block map 706, a non-zero map 708, a sign map 710, a level-1 map 712, a level-2 map 714, and a coefficient residue or residual map 716.

The transform block 704 is an example of a block of transform coefficients that can be received from the quantization step of an encoder, such as the quantization stage 406 of the encoder 400 of FIG. 4. The transform block 704 includes zero and non-zero transform coefficients. Some of the non-zero coefficients may be negative values.

The end-of-block map 706 indicates the end-of-block position for the transform block 704. The end-of-block position is the position at which there are no further non-zero values in the transform block 704, as determined when the transform coefficient positions are visited in the scan order being used. Thus, at and after the end-of-block position, all values are from the transform block 704 are zero. In the illustrated example, the zig-zag scan order 601 is used, non-zero coefficients that are other than the end-of-block position are indicated with a value of zero, and the end-of-block position is indicated with a value of one (1). In the illustrated example, the end-of-block is located at position [2, 2] as indicated by the value one (1) at that position, with preceding non-zero values indicated by the value zero.

The non-zero map 708 is a level map that indicates, for each position in the transform block 704, whether the corresponding transform coefficient is equal to zero or is a non-zero value. In the illustrated example, the non-zero map 708 includes a zero at the location of each transform coefficient that has a zero value and is located before the end-of-block position, and the non-zero map 708 includes the value one (1) at all locations that have a non-zero value in the transform block 704. The non-zero map 708 may also be referred to as a level-zero map.

The sign map 710 indicates, for each position of the transform block 704 that has a non-zero value, whether the corresponding transform coefficient has a positive value or a negative value. In the illustrated example, the value −1 indicates that the corresponding transform coefficient has a negative value, and the value one indicates that the corresponding transform coefficient has a positive value. Other symbols can be utilized, such as zero and one.

The non-zero map 708, the level-1 map 712, the level-2 map 714, and the coefficient residual map 716, in combination, define the absolute value for the transform coefficients from the transform block 704. Of these, the non-zero map 708, the level-1 map 712, the level-2 map indicate, using only binary values, whether the corresponding transform coefficients from the transform block 704 have an absolute value that is equal to zero, one, or two, or is greater than or equal to three. For each non-zero value, as indicated by the non-zero map 708, the level-1 map 712 includes the value zero if the absolute value of the corresponding transform coefficient is equal to one, or includes the value one if the absolute value of the transform coefficient is greater than or equal to two. For each value indicated as greater than or equal to two in the level-1 map 712, the level-2 map 714 includes the value zero if the absolute value of the corresponding transform coefficient is equal to two, or includes the value one if the absolute value of the transform coefficient is greater than or equal to three.

In one alternative example, a single level map can replace the non-zero map 708, the level-1 map 712, and the level-2 map, by using a two bit value to indicate, for each transform coefficient from the transform block 704, whether the absolute value of the transform coefficient is equal to zero, one, or two, or is greater than or equal to three. In another alternative example, a different number of level maps can be used, in which case the threshold at which a residual value is present will change.

In the illustrated example, the coefficient residual map 716 includes the residue for each transform coefficient from the transform block 704. The residue for each transform coefficient from the transform block 704 is the magnitude of the transform coefficient in excess of the representation of the magnitude in the level maps. In this example, residue for each transform coefficient from the transform block 704 is calculated as the absolute value of the transform coefficient from the transform block 704 minus three.

Figure 8:
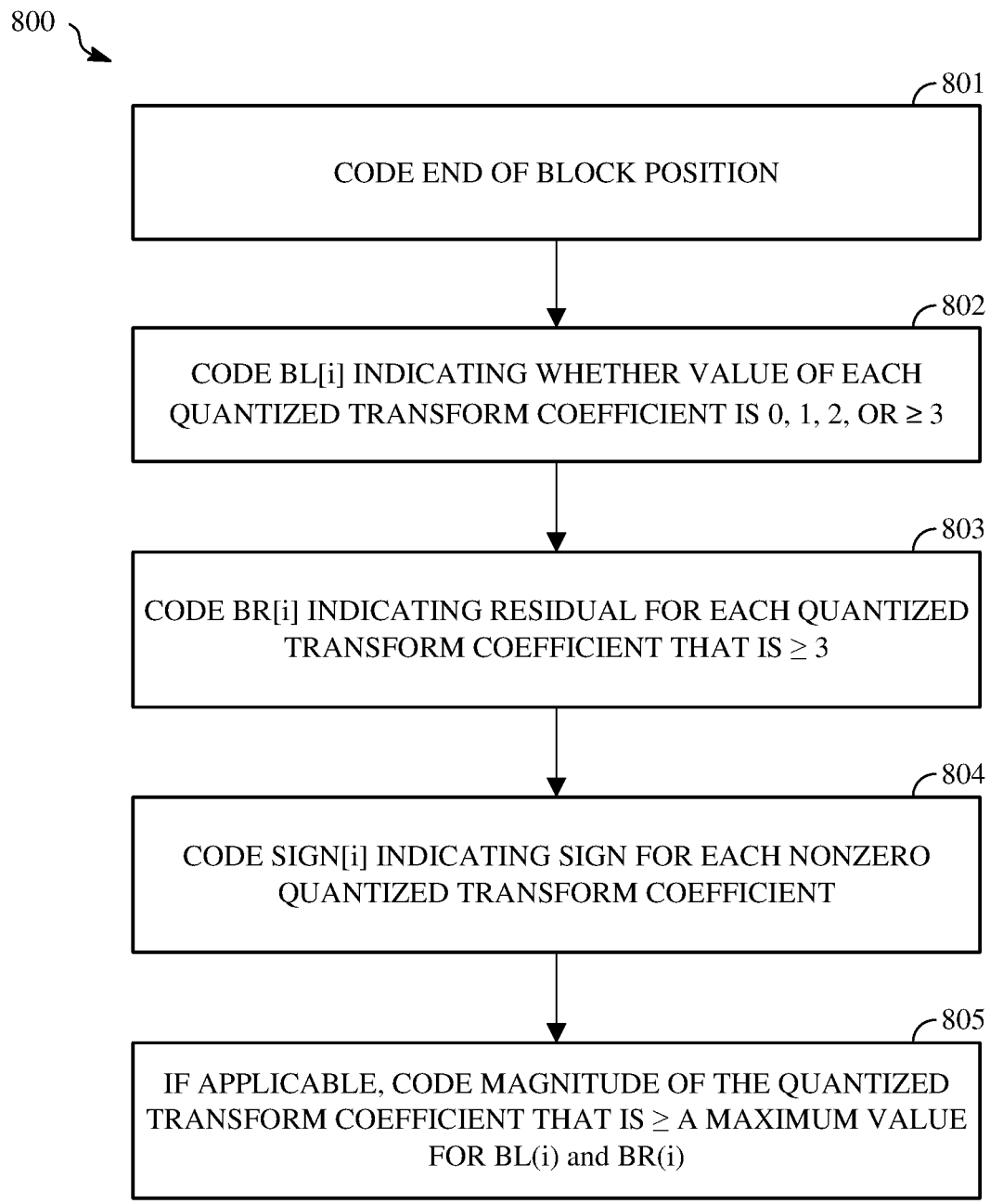
FIG. 8 is a flowchart diagram of a process for encoding a transform block in an encoded video bitstream using level maps according to an implementation of this disclosure.

FIG. 8 is a flowchart diagram of a process 800 for encoding a transform block in an encoded video bitstream using level maps according to an implementation of this disclosure. The process 800 can be implemented in an encoder such as the encoder 400. The encoded video bitstream can be the compressed bitstream 420 of FIG. 4.

The process 800 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 800. In at least some implementations, the process 800 can be performed in whole or in part by the entropy encoding stage 408 of the encoder 400.

The process 800 can be implemented using specialized hardware or firmware. Some computing devices can have multiple memories, multiple processors, or both. The steps or operations of the process 800 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 800 can receive a transform block, such as the transform block 704 of FIG. 7. The transform block 704 can be received as the output from the quantization step of an encoder, such as the quantization stage 406 of the encoder 400 of FIG. 4. The transform block 704 includes zero and non-zero transform coefficients. Some of the non-zero coefficients may be negative values.

In operation 801, the end-of-block position (EOB) is encoded by generating and including values in the encoded video bitstream that indicate the end-of-block position. In an implementation of the process 800, operation 802 can include generating an end-of-block map for the transform block, as explained with respect to the end-of-block map 706. At and after EOB, all coefficients are zeroes.

In operation 802, a value BL[i] is coded to indicate the magnitude of the transform coefficient, where i denotes the scan position (i=0 corresponds to the top-left position, which is commonly referred to as the DC position), and BL[i] denotes whether the magnitude of the quantized coefficient at scan position i is 0, 1, 2, or ≥3. The value BL[i] is coded (e.g., 0, 1, 2, or 3) for each position in the scan order in reverse order from the position before the end-of-block position (i=EOB−1) to the DC position (i=0). In some implementations, the value BL[i] is coded in operation 802 using level maps, such as the non-zero map 708, the level-1 map 712, and the level-2 map 714.

The value BL[i] is coded into the video bitstream in operation 802 using context-based arithmetic coding methods. Context-based arithmetic coding methods utilize a context model, which can be determined based on the binary values of any number of previously coded neighbors, and can fully utilize information from all these neighbors. The previously coded neighbors can be neighbors in the same level map or a preceding level map, such as an immediately preceding level map. For example, the level-1 map 712 can provide context information for coding the level-2 map 714.

In some implementations of the process 800, operation 801 and operation 802 are combined by interleaving the end-of-block map 706 into the non-zero map 708.

In operation 803, a residual value, referred to as BR[i], is coded for all transform coefficients that have an absolute value for its magnitude greater than what is represented by the value BL[i], which in the present example represents quantized transform coefficients having an absolute value of 0, 1, and 2 without use of a residual value. Thus, in this example, for each quantized transform coefficient having an absolute value for its magnitude greater than two (e.g., BL(i)=3), the value BR[i] denotes the magnitude of the quantized transform coefficient at scan position i, and is equal to the magnitude value of the quantized transform coefficient for scan position i minus three.

Like the values BL[i], the residual values BR[i] can be coded into the video bitstream in operation 803 using context-based arithmetic coding methods. Context-based arithmetic coding methods utilize a context model, which can be determined based on the binary values of any number of previously coded neighbors, and can fully utilize information from all these neighbors. The previously coded neighbors can be neighbors in the same level map or a preceding level map, such as an immediately preceding level map. The residual values BR[i] can be encoded in the encoded video bitstream using binary coding or multi-symbol coding. A probability distribution that fits the statistics of the residual coefficients of the coefficients residue map can be used. The probability distribution can be a geometric distribution, a Laplacian distribution, a Pareto distribution, or any other distribution.

In operation 804, a value is coded for each non-zero quantized transform coefficient indicating whether the sign of the quantized transform coefficient is positive or negative. This value may be referred to as Sign[i], where i denotes the scan position and Sign[i] denotes the sign of the non-zero coefficient at scan position i. Operation 804 may be performed using the sign map 710. Coding Sign[i] may be performed using context-based or non-context-based entropy coding techniques.

In some implementations, the available values for BR(i) may include a maximum value. In an example, BR(i) may take any of the values from 0 to 12 when BL(i) is equal to 3. Together with BL(i), this corresponds to absolute values for the magnitude L(i) of the quantized transform coefficient at scan position i of 0 through 15. A value of 12 for BL(i) can indicate that the residual value is greater than or equal to 15. If applicable (i.e., BR(i) has a maximum value and the magnitude L(i) of the quantized transform coefficient is greater than or equal to 15), the magnitude of the quantized transform coefficient minus 15 (L(i)−15) is coded in operation 805. The magnitudes can be encoded in the encoded video bitstream using binary coding or multi-symbol coding. A probability distribution that fits the statistics of the residual coefficients of the coefficients residue map can be used. The probability distribution can be a geometric distribution, a Laplacian distribution, a Pareto distribution, or any other distribution. Coding the resulting symbols may not require any context derivation. That is, the symbols may not be context-coded.

In some embodiments, coding of BL and BR symbols may have its own loop for the current block followed by another loop for coding of applicable signs and the magnitude of the quantized transform coefficient minus 15 in the same block.

The quantized transform coefficients may be reconstructed using the coded values to verify the encoding after operation 805.

In the process 800, spatial neighboring templates can be utilized for determining context models used in context-based arithmetic coding methods. For example, in operation 802, the context used to code the value BL[i] is derived by using a spatial template anchored to the block position (r_i, c_i) corresponding to the scan position i, where r_i denotes the row index and c_i denotes the column index.

Figure 9A:
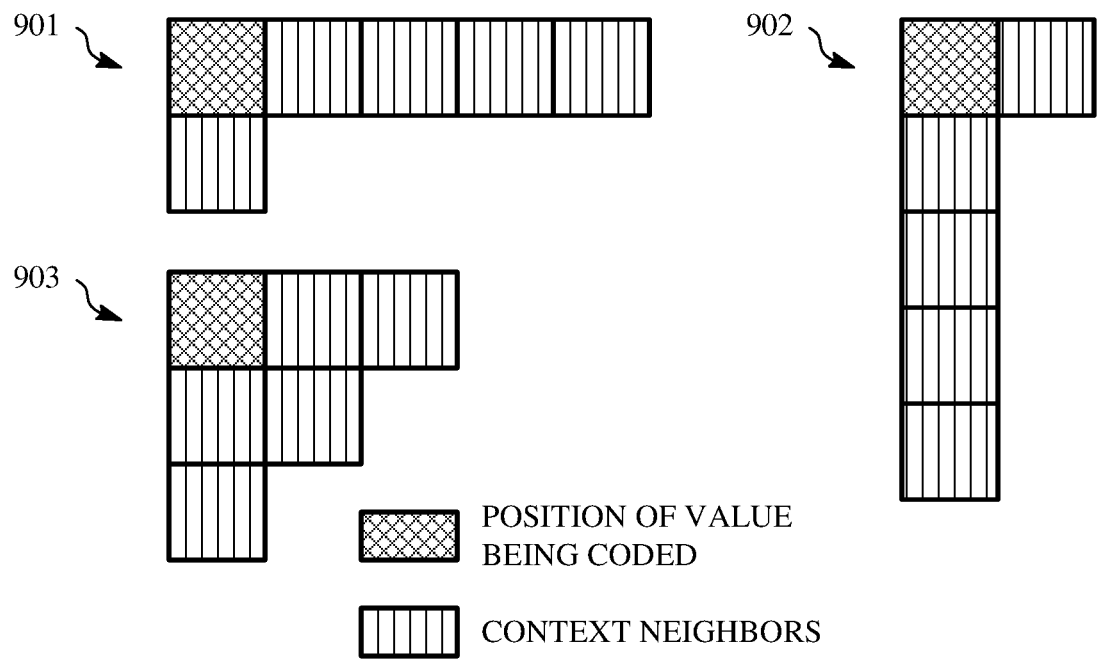
FIG. 9A is a diagram showing a first set of spatial neighboring templates that can be utilized in context-based arithmetic coding methods in accordance with implementations of this disclosure.

FIG. 9A is a diagram showing a first set of spatial neighboring templates that can be utilized in context-based arithmetic coding methods in accordance with implementations of this disclosure. A horizontal template 901 includes multiple context neighbors that are in the same row as the position of a transform coefficient to be coded (i.e., a transform coefficient to be encoded or decoded that may be referred to herein as a position to be coded for brevity), and one context neighbor in the same column as the position to be coded. In the illustrated example, the horizontal template 901 includes four context neighbors to the right of the position to be coded and one context neighbor below the position to be coded. A vertical template 902 includes one context neighbor that is in the same row as the position to be coded, and multiple context neighbors in the same column as the position to be coded. In the illustrated example, the vertical template 902 includes one context neighbor to the right of the position to be coded and four context neighbors below the position to be coded. A two-dimensional template 903 includes context neighbors in a triangular pattern that is anchored at the position to be coded. In the illustrated example, the two-dimensional template 903 includes two context neighbors to the right of the position to be coded, two context neighbors below the position to be coded, and one context neighbor that is located diagonally downward and rightward relative to the position to be coded.

Figure 9B:
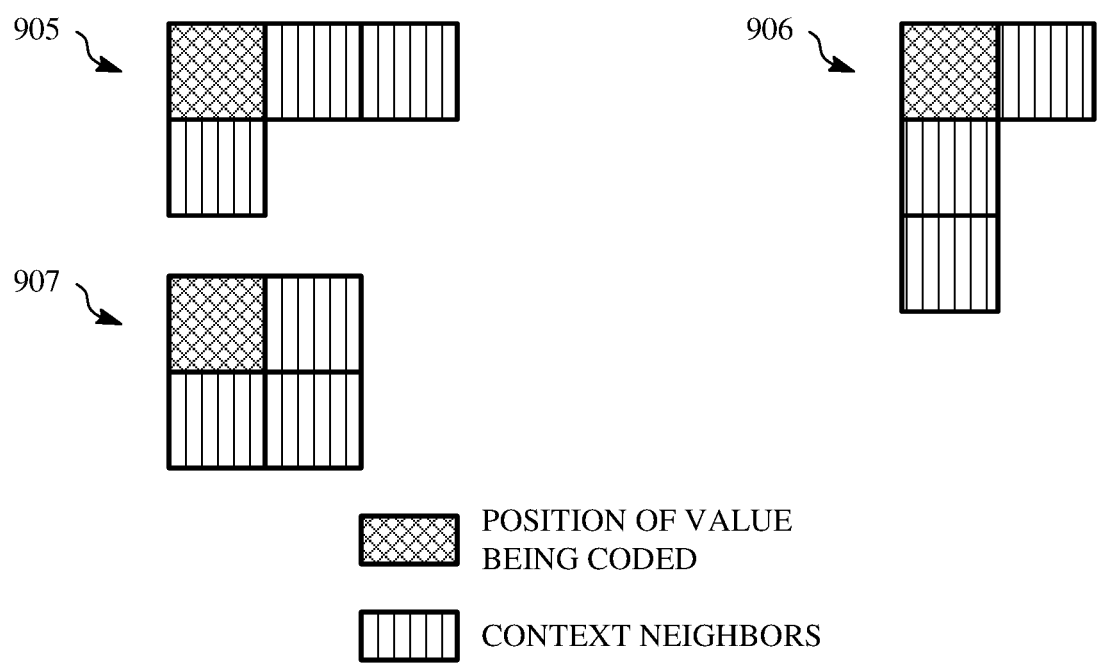
FIG. 9B is a diagram showing a second set of spatial neighboring templates that can be utilized in context-based arithmetic coding methods in accordance with implementations of this disclosure.

The first set of spatial neighboring templates illustrated in FIG. 9A may be used to derive contexts for BL[i]. The same or a different set of spatial neighboring templates may be used to derive contexts for BR[i]. FIG. 9B is a diagram showing a second set of spatial neighboring templates that can be utilized in context-based arithmetic coding methods in accordance with implementations of this disclosure. For example, the second set of spatial neighboring templates may be used to derive contexts for BR[i].

In the second set of spatial neighboring templates, a horizontal template 905 includes multiple context neighbors that are in the same row as a position to be coded, and one context neighbor in the same column as the position to be coded. In the illustrated example, the horizontal template 905 includes two context neighbors to the right of the position to be coded and one context neighbor below the position to be coded. A vertical template 906 includes one context neighbor that is in the same row as the position to be coded, and multiple context neighbors in the same column as the position to be coded. In the illustrated example, the vertical template 906 includes one context neighbor to the right of the position to be coded and two context neighbors below the position to be coded. A two-dimensional template 907 includes context neighbors in a triangular pattern that is anchored at the position to be coded. In the illustrated example, the two-dimensional template 907 includes one context neighbor to the right of the position to be coded, one context neighbor below the position to be coded, and one context neighbor that is located diagonally downward and rightward relative to the position to be coded.

The spatial neighboring template that is used in a specific coding operation may be selected based on the transform type used to determine the quantized transform coefficients. For example, if the transform type is a one-dimensional horizontal transform (TX_CLASS_HORIZ) type, the horizontal template 901 and/or the horizontal template 905 may be used. If the transform type is a one-dimensional vertical transform type (TX_CLASS_VERT), the vertical template 902 and/or the vertical template 906 may be used. If the transform type is a two-dimensional transform type (TX_CLASS_2D), the two-dimensional template 903 and/or the two-dimensional template 907 may be used.

During context-based coding, obtaining the values to be used in the selected template as context neighbors may become costly in a naive implementation, such as one that obtains the needed values by a table lookup. That is, for example, there are three transform type classes, each of which has its own templates, a straightforward implementation may need at least three arrays to store the neighborhood positions for each valid transform size. A practical implementation is further complicated where the codec specifies a number of scan orders. In this situations, the arrays may need to be defined based on block positions instead of scan positions to avoid being scan order dependent. Accordingly, table lookups can result in performance issues, such as memory bottlenecks. Performance issues may be more common, for example, when the block size is large (e.g., a 32×32 transform block, which has 1024 positions).

According to implementations of this disclosure, performance can be improved by storing needed information in memory registers arrays, or simply register arrays. To allow use of register arrays for this purpose, the scan orders used for coding of transform coefficients, such as the zig-zag scan order 601, the horizontal scan order 602, and the vertical scan order 603, share common properties in that the coefficients in a row are visited from left to right and coefficients in a column are visited from top to bottom in the scan order. Stated another way, given a scan order S, iS[r, c] denotes the scan position for a valid block position [r, c], where r denotes the row index and c denotes the column index in a transform block. Then iS[r, c]<iS[r', c] for any r'>r and iS[r, c]<iS[r, c'] for any c'>c. Thus, during coding of level maps, when coded in reverse scan order, the context neighbors needed for coding a current value to be coded have already been visited.

Figure 10:
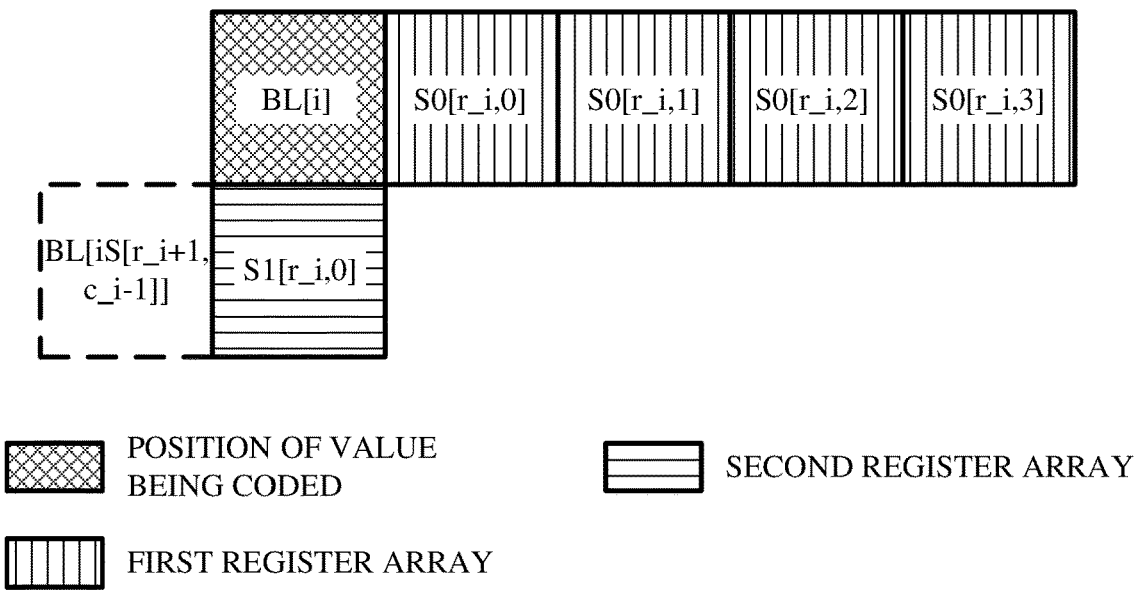
FIG. 10 is a diagram that shows a first example of a register set that corresponds to a horizontal template.
Figure 11:
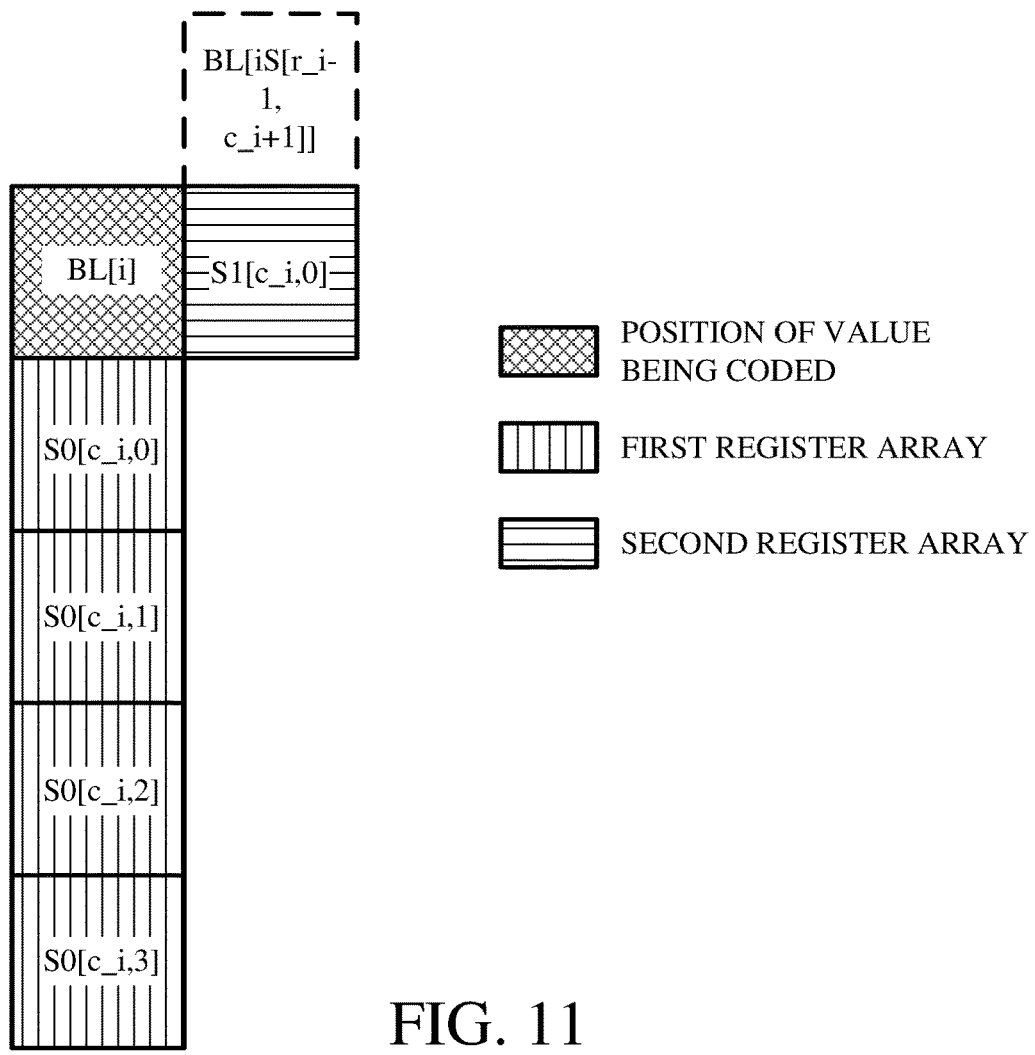
FIG. 11 is a diagram that shows a first example of a register set that corresponds to a vertical template.
Figure 12:
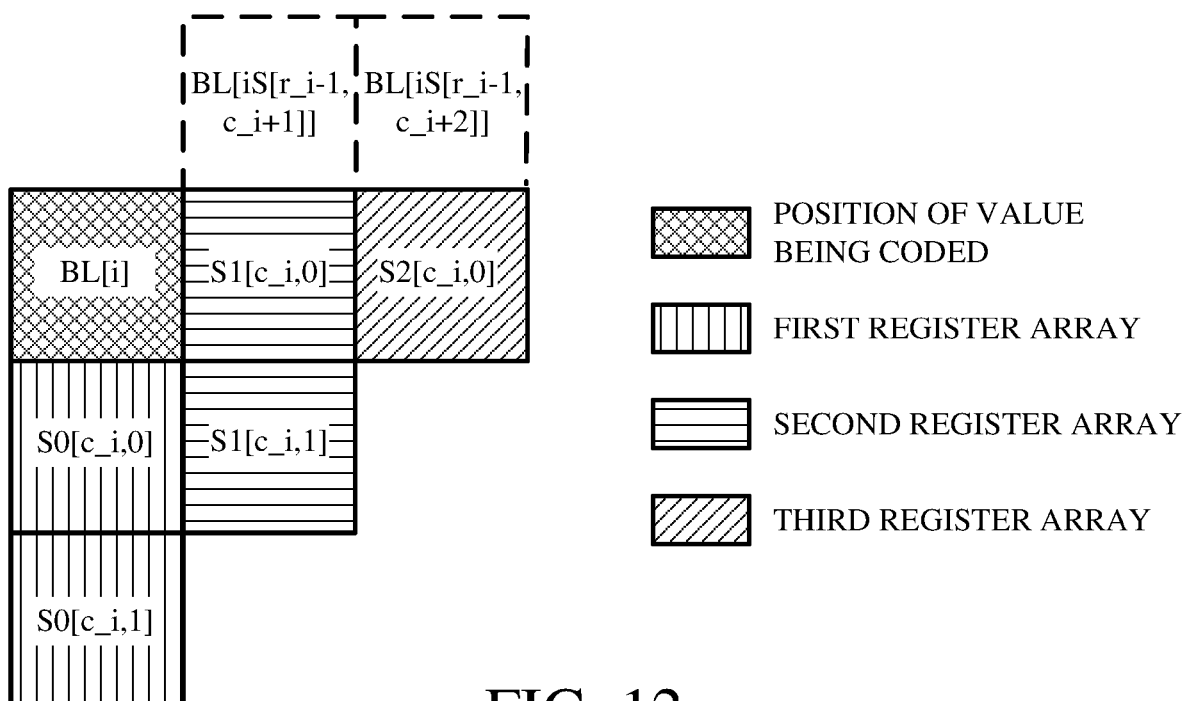
FIG. 12 is a diagram that shows a first example of a register set that corresponds to a two-dimensional template.

In the implementations that will be described herein, information needed for context derivation is stored sets of registers, for example, in register sets comprising two or three register arrays, as shown initially the example of FIGS. 10-12. FIG. 10 is a diagram that shows a first example of a register set that corresponds to a horizontal template. FIG. 11 is a diagram that shows a first example of a register set that corresponds to a vertical template. FIG. 12 is a diagram that shows a first example of a register set that corresponds to a two-dimensional template. The example of FIGS. 10-12 uses the first set of spatial neighboring templates of FIG. 9A to derive the contexts for base level symbols (i.e., BL[i]).

By using a limited set of memory or register arrays, context information for all positions of the transform block need not be held in memory. The register sets implement template-based coding by holding values for locations in the template being used, such as the horizontal template 901, the vertical template 902, and the two-dimensional template 903 in this example. Thus, the register sets can correspond to the size and shape of the template being used, with each register value corresponding to a particular spatial location (e.g., a context neighbor) in the template. Accordingly, a value within a register array may be referred to herein as a context neighbor value. In some implementations, the register sets include at least a first register array that has a first size (e.g., for storing a first number of values) and a second register array that has a second size (e.g., for storing a second number of values) that is different than the first size.

The values in the register arrays of a register set are initially set to a default value (e.g., zero). Whenever a position [r, c] is out of block boundary, a default value such as 0 may be used at the position. Once a value is coded (e.g., a symbol is encoded or decoded), the register arrays are updated for use in coding the next value, using the value of the position that was coded and/or base information obtained from the level maps.

For a transform of size M×N in TX_CLASS_HORIZ, the number of register arrays in a register set is equal to the number of rows N. In this implementation, a register set includes one 8-bit register array and one 2-bit register array, which hold values corresponding to the horizontal template 901 on a per-row basis. The register set is used for coding a particular value in a row of the transform block. For a transform of size M×N in TX_CLASS_VERT, the number of register arrays in a register set is equal to the number of columns M. In this implementation, a register set includes one 8-bit register array and one 2-bit register array, which hold values corresponding to the vertical template 902 on a per-column basis. The register set is used for coding a particular value in a column of the transform block. For a transform of size M×N in TX_CLASS_2D, the number of register arrays in a register set is equal to the lower of the number of columns M and the number of rows N. In this implementation, a register set includes two 4-bit register arrays and one 2-bit register array, which hold values corresponding to the two-dimensional template 903. Thus, context neighbor values are stored in the register set for the context neighbors defined by the shape of the two-dimensional template 903, on either of a per-column or per-row basis (dependent on the smaller dimension of the transform), and a register set is used for coding a particular value in a column or row of the transform block. The register sets described above all store values using 2-bit precision (e.g., an 8-bit register stores four 2-bit values and a 2-bit register stores one 2-bit value). It should be understood, however, that values of differing precisions could be utilized. It should further be understood that the number of values held in each register array can be changed according to the geometry of a particular spatial template.

For coding a transform block determined using TX_CLASS_HORIZ and a context corresponding to the horizontal template 901, there are N register arrays, corresponding to rows r=0 through N−1. FIG. 10 is a diagram that shows an example of a register set that corresponds to the horizontal template 901. Each register set includes two register arrays, including a first register array S0 and a second register array S1, which are defined respectively as:

S0[$r$, 0], S0[$r$, 1], S0[$r$, 2], S0[$r$, 3], and
S1[$r$, 0].

As shown in FIG. 10, the register array S0 stores values for the same row and to the right of a scan position i of one or more values for the transform coefficient being coded that indicates the magnitude of the transform coefficient, and the register array S1 stores a single value in the same column and one row below the scan position i of the one or more values for the transform coefficient being coded that indicates the magnitude of the transform coefficient. The scan position i is labeled BL[i] here and in FIGS. 11-15 discussed below because it is the value BL[i] for the transform coefficient at the scan position i that is being coded (i.e., either encoded or decoded) in these examples. Accordingly, the scan position i may be referred to as the position of the value BL[i] being coded herein.

For coding a transform block determined using TX_CLASS_VERT and a context corresponding to the vertical template 902, there are M register arrays, corresponding to columns c=0 through M−1. FIG. 11 is a diagram that shows an example of a register set that corresponds to the vertical template 902. Each register set includes two register arrays, including a first register array S0 and a second register array S1, which are defined respectively as:

S0[$c$, 0], S0[$c$, 1], S0[$c$, 2], S0[$c$, 3], and
S1[$c$, 0].

As shown in FIG. 11, the register array S0 stores values for the same column and below the position of the value BL[i] being coded, and the register array S1 stores a single value in the same row and one row to the right of the position of the value BL[i] being coded.

For coding a transform block determined using TX_CLASS_2D, with reference to an example in which the transform block has fewer columns M than rows N (i.e., M<N), and using a context corresponding to the two-dimensional template 903, there are M register arrays, corresponding to columns c=0 through M−1. FIG. 12 is a diagram that shows an example of a register set that corresponds to the two-dimensional template 903. Each register set includes three registers arrays, including a first register array S0, a second register array S1, and a third register array S3, which are defined respectively as:

S0[$c$, 0], S0[$c$, 1],
S1[$c$, 0], S1[$c$, 1], and
S2[$c$, 0].

As shown in FIG. 12, the register array S0 stores values for the same column as the position of the value BL[i] being coded, the register array S1 stores values one column to the right of the position of the value BL[i] being coded, and the register array S2 stores a single value located two columns to the right of the position of the value BL[i] being coded. In some implementations, each register set is organized into three arrays, where in the first array (for S0) has size 2 (i.e., stores two coefficient neighbor values), the second array (for S1) has size 2 (i.e., stores two coefficient neighbor values), and the third array (for S2) has size 1 (i.e., stores one coefficient neighbor value).

At the beginning of coding a transform block, the register set is defined according to the transform type that was used to determine the transform coefficients for the transform block, and all of the values in a register set are initialized to zero. The value BL[i] to be coded at scan position i, where BL[i] is from {0, 1, 2, 3}, is assigned a block position corresponding to the scan position i denoted by row r_i and column c_i. When encoding, the value BL[i] is obtained from base information, such as the level maps. In decoding, the input is the portion of the encoded bitstream from which the value BL[i] is derived. The context to entropy code the value BL[i] is determined by combining (e.g., summing) the values from the register arrays, which represent the spatial context neighbors of the value BL[i] according to the template that corresponds to the transform type.

If the transform type is one in TX_CLASS_HORIZ, the context used to code the value BL[i] is derived from:

S0[$r\_i$, 0]+S0[$r\_i$, 1]+S0[$r\_i$, 2]+S0[$r\_i$, 3]+S1[$r\_i$, 0].

After the value BL[i] is coded, the register array values are updated as follows:

S0[$r\_i$, 0]=BL[i],
S0[$r\_i$, 1]=S0[$r\_i$, 0],
S0[$r\_i$, 2]=S0[$r\_i$, 1],
S0[$r\_i$, 3]=S0[$r\_i$, 2], and
S1[$r\_i$, 0]=BL[iS[r_i+1, c_i−1]].

To summarize the foregoing, the values in a register array are updated to assume the values of their immediate neighbors, which in this case are values of the positions to the immediate left of the locations represented by each of the values in the register array. For register array S0, the first value S0[$r\_1$, 0] is updated to the value at the position that was just coded BL[i]. The remaining values in register array S0 assume the values from the preceding value in the register array (i.e., values in the register array are shifted by one position). For the register array S1, the sole value is updated using base information obtained from the level maps, namely the value to be coded for the cell located one row below and one column to the left of the position of the value BL[i] that was just coded, which is labeled with as value BL[iS[r_i+1, c_i−1]]. After updating, this register set is ready for use in coding the next value in the same row (i.e., the value in the position directly to the left of the position of the value BL[i] that was just coded).

If the transform type is one in TX_CLASS_VERT, the context used to code the value BL[i] is derived from S0[$c\_i$, 0]+S0[$c\_i$, 1]+S0[$c\_i$, 2]+S0[$c\_i$, 3]+S1[$c\_i$, 0].

After the value BL[i] is coded, the register arrays are updated as follows:

S0[$c\_i$, 0]=BL[i],
S0[$c\_i$, 1]=S0[$c\_i$, 0],

S0[$c\_i$, 2]=S0[$c\_i$, 1],
S0[$c\_i$, 3]=S0[$c\_i$, 2], and
S1[$c\_i$, 0]=BL[iS[r_i−1, c_i+1]].

To summarize the foregoing, the values in the register arrays are updated to assume the values of their immediate neighbors, which in this case are values of the positions immediately above the locations represented by each of the values in the register array. For register array S0, the first value S0[$c\_i$, 0] is updated to the value BL[i] that was just coded. The remaining values in the register array S0 assume the values from the preceding value in the register array (i.e., values in the register array are shifted by one position). For register array S1, the sole value is updated using base information obtained from the level maps, namely the value to be coded for the cell located one row above and one column to the right of the position of the value BL[i] that was just coded, which is value BL[iS[r_i−1, c_i+1]]. After updating, this register set is ready for use in coding the next value in the same column (i.e., the value in the position directly above the position of the value BL[i] that was just coded).

If the transform type is one in TX_CLASS_2D, continuing the example in which the transform block has fewer columns M than rows N (i.e., M<N), the context used to code the value BL[i] is derived by:

S0[$c\_i$, 0]+S0[$c\_i$, 1]+S1[$c\_i$, 0]+S1[$c\_i$, 1]+S2[$c\_i$, 0].

After the value BL[i] is coded, the register arrays are updated as follows.

S0[$c\_i$, 0]=BL[i],
S0[$c\_i$, 1]=S0[$c\_i$, 0],
S1[$c\_i$, 0]=BL[iS[r_i−1, c_i+1]],
S1[$c\_i$, 1]=S1[$c\_i$, 0], and
S2[$c\_i$, 0]=BL[iS[r_i−1, c_i+2]].

To summarize the foregoing, the values in the register arrays are updated to assume the values of their immediate neighbors, which in this case are values of the positions immediately above the locations represented by each of the values in the register arrays. For the register array S0, the first value S0[$c\_i$, 0] is updated to the value that was just coded BL[i], and the second value in register array S0, denoted by S0[$c\_i$, 1], assumes the value from the preceding value in the register array (i.e., values in the register array are shifted by one position), which in this example is the value S0[$c\_i$, 0]. For the second register array S1, the first value is updated using base information obtained from the level maps, namely the value to be coded for the cell located one row above and one column to the right of the position of the value BL[i] that was just coded, which is value BL[iS[r_i−1, c_i+1]], and the second value assumes the value from the first value of the second register array S1[$c\_i$, 0]. For the third register array S2, the sole value is updated using base information obtained from the level maps, namely the value to be coded for the cell located one row above and two columns to the right of the position of the value BL[i] that was just coded, which is value BL[iS[r_i−1, c_i+2]]. After updating, this register set is ready for use in coding the next value in the same column (i.e., the value in the position directly above the position of the value BL[i] that was just coded). In an example in which there are fewer rows than columns, the register arrays can instead be defined on a per-row basis, with each register set being used to provide context for coding values in a row.

When the base range symbols (i.e., BR[i]) are context-encoded, the contexts may be derived similarly to the contexts for base level symbols as described above with regard to FIGS. 10-12. Alternatively, the contexts may be derived using different templates, such as those shown in FIG. 9B, and register arrays appropriate to the number and locations of the context neighbors. Like the register set described above with respect to FIGS. 10-12, a first group of register values (e.g., a register array) is updated using only information obtained from the register set, and a second group of register values (e.g., a register array) is updated using base information obtained from, for example, the level maps. This implementation reduces reliance on base information, which can increase efficiency and avoid performance issues such as memory bottlenecks while accurately modelling the context for each value being coded.

Figure 13:
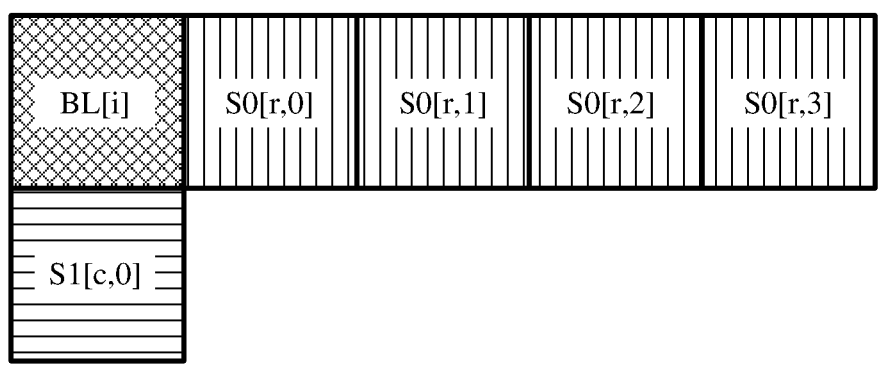
FIG. 13 is a diagram that shows a second example of a register set that corresponds to a horizontal template.
Figure 13:
Figure 14:
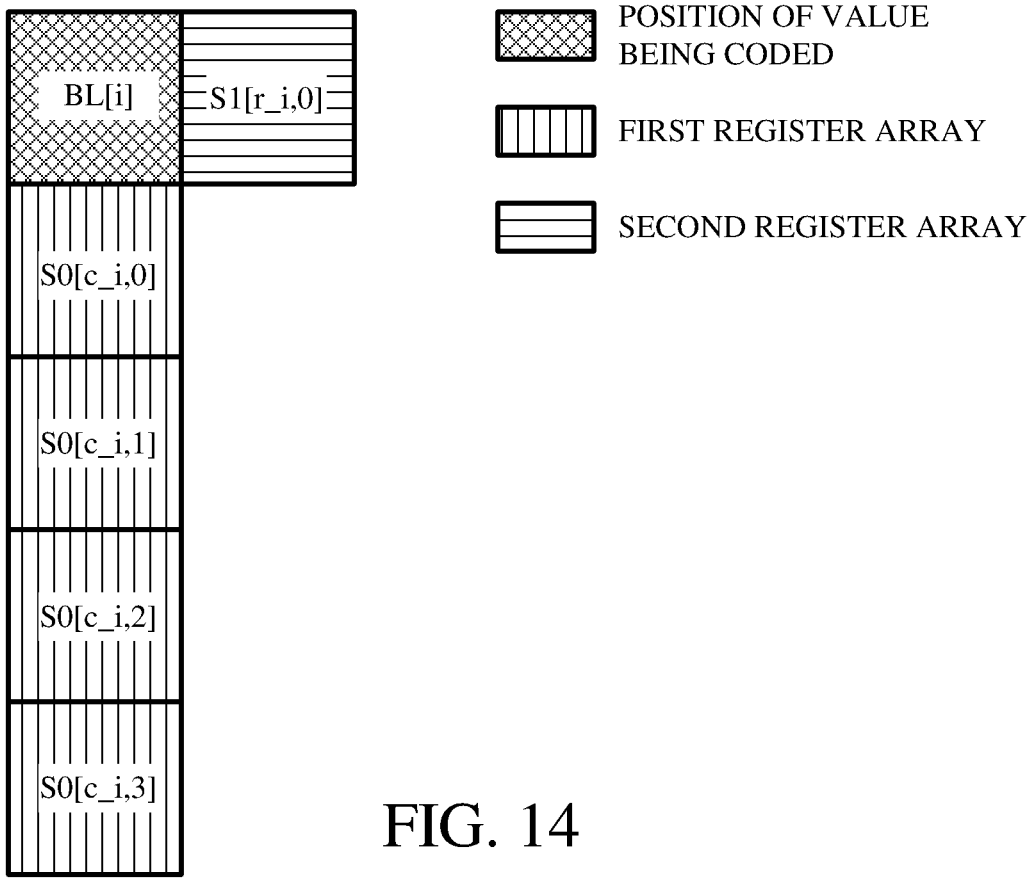
FIG. 14 is a diagram that shows a second example of a register set that corresponds to a vertical template.
Figure 15:
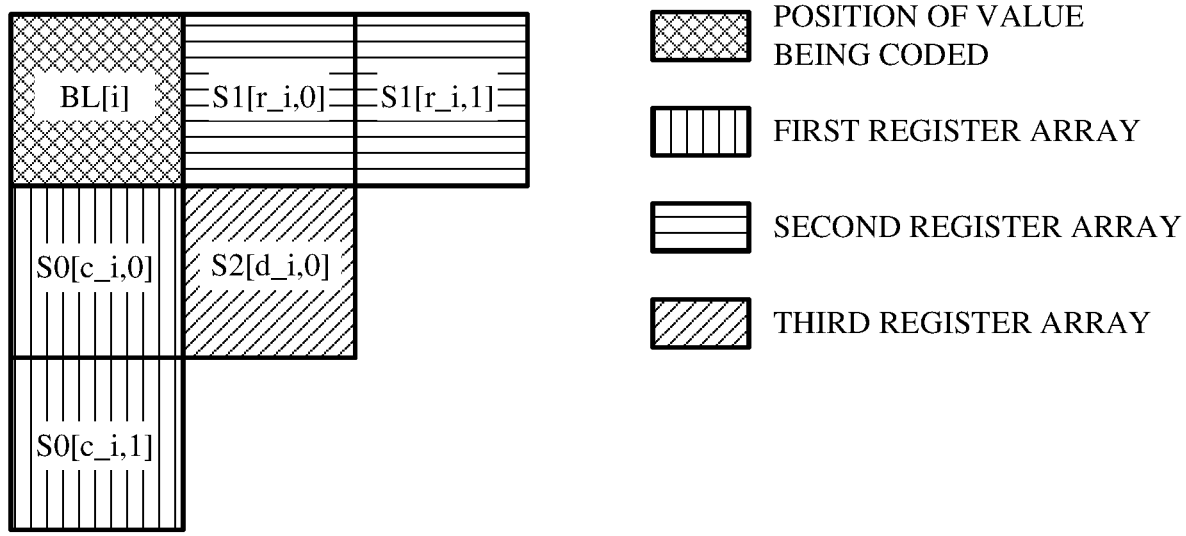
FIG. 15 is a diagram that shows a second example of a register set that corresponds to a two-dimensional template.

A second example in which information needed for context derivation is stored in register sets is shown in FIGS. 13-15. FIG. 13 is a diagram that shows a second example of a register set that corresponds to a horizontal template. FIG. 14 is a diagram that shows a second example of a register set that corresponds to a vertical template. FIG. 15 is a diagram that shows a second example of a register set that corresponds to a two-dimensional template. In FIGS. 13-15, the first set of templates of FIG. 9A are used as an example. This implementation avoids accessing previously coded base information, other than the value BL[i] being coded, to update register arrays after the value BL[i] is coded. Instead, the values that are not obtained by shifting of other values through the register arrays are based on the value BL[i]. This implementation may be preferable in cases where accessing the base information is costly.

For a transform of size M×N in TX_CLASS_HORIZ, one 8-bit register array may be defined to hold four 2-bit values for each row and one 2-bit register array may be defined to hold one 2-bit value for each column to hold values that correspond spatially to the horizontal template 901, with the values to the right of the value being coded stored on a per-row basis, and the value below the value being coded stored on a per-column basis. For a transform of size M×N in TX_CLASS_VERT, one 8-bit register array may be defined to hold four 2-bit values for each column and one 2-bit register array may be defined to hold one 2-bit value for each row, with these register arrays holding values that correspond spatially to the vertical template 902, with the values below the value being coded stored on a per-column basis, and the value to the right of the value being coded stored on a per-row basis. For a transform of size M×N in TX_CLASS_2D, one 4-bit register array may be defined to hold two 2-bit values for each row, one 4-bit register array may be defined to hold two 2-bit values for each column, and one 2-bit register array may be defined to hold one 2-bit value for each diagonal to hold values that correspond spatially to the two-dimensional template 903, with the values to the right of the value being coded stored on a per-row basis, the values below the value being coded stored on a per-column basis, and the value diagonally below and to the right of the value being coded stored on a per-diagonal basis. The foregoing examples utilize registers that have 2 bits of precision for each value. It should be understood, however, that values of differing precisions could be utilized. It should further be understood that the number of values held in each register can be changed according to the geometry of a particular spatial template.

For coding a transform block of size M×N determined using TX_CLASS_HORIZ using a context corresponding to the horizontal template 901, a first register array S0 is defined for each row (i.e., for r=0, 1, . . . , N−1), and a second register array S1 is defined for each column (i.e., for c=0, 1, . . . , M−1). The first register array S0 and the second register array S1 are defined respectively as:

S0[$r$, 0], S0[$r$, 1], S0[$r$, 2], S0[$r$, 3] for r=0, 1, ..., N-1, and

S1[$c$, 0] for c=0, 1, ..., M-1.

As shown in FIG. 13, the register array S0 includes values for the same row and to the right of the position of the value BL[i] being coded, and the register array S1 includes a single value in the same column and one row below the position of the value BL[i] being coded.

For coding a transform block of size M×N determined using TX_CLASS_VERT and a context corresponding to the vertical template 902, a first register array S0 is defined for each column (i.e., for c=0, 1, ..., M-1), and a second register array S1 is defined for each row (i.e., for r=0, 1, ..., N-1). The first register array S0 and the second register array S1 are defined respectively as:

S0[$c$, 0], S0[$c$, 1], S0[$c$, 2], S0[$c$, 3] for c=0, 1, ..., M-1, and

S1[$r$, 0] for r=0, 1, ..., N-1.

As shown in FIG. 14, the register array S0 includes values for the same column and below the position of the value BL[i] being coded, and the register array S1 includes a single value in the same row and one column to the right of the position of the value BL[i] being coded.

For coding a transform block of size M×N determined using TX_CLASS_2D and a context corresponding to the two-dimensional template 903, a first register array S0 is defined for each column (i.e., for c=0, 1, ..., M-1), a second register array S1 is defined for each row (i.e., for r=0, 1, ..., N-1), and a third register array S2 is defined for each diagonal. The first register array S0, the second register array S1, and the third register array S2 are defined respectively as:

S0[$c$, 0], S0[$c$, 1] for c=0, 1, ..., M-1,

S1[$r$, 0], S1[$r$, 1] for r=0, 1, ..., N-1, and

S2[$d$, 0] for d=0, 1, ..., M+N-2.

In the foregoing definition of the third register array S2, d is the index of the diagonal line, and can be determined based on the row index [r] and the column index [c] as follows:

d=0 if (r==c), and d=2*abs(r-c)+(r<c) if (r!=c).

In defining the index d, the code (r<c) evaluates to zero when r<c is false and to one when r<c is true. Note that any bijective mapping of (r-c) to {0, 1, ..., M+N-2} can be used to define the index d. In cases where negative indices are allowed, r-c or c-r can be used directly as definition of the index d. As shown in FIG. 15, the first register array S0 includes values for the same column and below the position of the value BL[i] being coded, the second register array S1 includes values for the same row and to the right of the position of the value BL[i] being coded, and the third register array S2 includes a single value diagonally below and to the right of the position of the value BL[i] being coded.

At the beginning of coding a transform block, the register sets are defined according to the transform type that was used to determine the transform coefficients for the transform block, and all of the values in the register arrays are initialized to zero. The value BL[i] being coded is for scan position i, where the value BL[i] is an integer from {0, 1, 2, 3}. The block position corresponding to the scan position i is denoted by row r_i and column c_i, as with the earlier examples. In encoding, the value BL[i] is obtained from base information, such as the level maps. In decoding, the value BL[i] is derived from a portion of the encoded bitstream using the context. The context to code the value BL[i] is determined by summing the values from the register arrays, which represent the spatial context neighbors of the value BL[i] according to the template that corresponds to the transform type.

Referring to FIG. 13, if the transform type is one in TX_CLASS_HORIZ, the context used to code the value BL[i] is derived from:

S0[$r\_i$, 0]+S0[$r\_i$, 1]+S0[$r\_i$, 2]+S0[$r\_i$, 3]+S1[$c\_i$, 0].

After the value BL[i] is coded, the register arrays are updated as follows:

S0[$r\_i$, 0]=BL[i],

S0[$r\_i$, 1]=S0[$r\_i$, 0],

S0[$r\_i$, 2]=S0[$r\_i$, 1],

S0[$r\_i$, 3]=S0[$r\_i$, 2], and

S1[$c\_i$, 0]=BL[i].

For the register array S0, the first value S0[$r\_1$, 0] is updated to the value BL[i] that was just coded. The remaining values in the register array S0 assume the values from the preceding value in the register array (i.e., values in the register array are shifted by one position). For the register array S1, the sole value is updated to the value BL[i] that was just coded.

Referring to FIG. 14, if the transform type is one in TX_CLASS_VERT, the context used to code the value BL[i] is derived from:

S0[$c\_i$, 0]+S0[$c\_i$, 1]+S0[$c\_i$, 2]+S0[$c\_i$, 3]+S1[$r\_i$, 0].

After the value BL[i] is coded, the register arrays are updated as follows.

S0[$c\_i$, 0]=BL[i],

S0[$c\_i$, 1]=S0[$c\_i$, 0],

S0[$c\_i$, 2]=S0[$c\_i$, 1],

S0[$c\_i$, 3]=S0[$c\_i$, 2], and

S1[$r\_i$, 0]=BL[i].

For the register array S0, the first value S0[$c\_i$, 0] is updated to the value BL[i] that was just coded. The remaining values in the register array S0 assume the values from the preceding value in the register array (i.e., values in the register array are shifted by one position). In other words, the register array S0 is updated in a first-in-first-out (FIFO) manner by shifting out the oldest value and adding the value BL[i] as the newest entry. For the register array S1, the sole value is updated to the value BL[i] that was just coded.

If the transform type is one in TX_CLASS_2D, the context used to code the value BL[i] is derived from:

S0[$c\_i$, 0]+S0[$c\_i$, 1]+S1[$r\_i$, 0]+S1[$r\_i$, 1]+S2[$d\_i$, 0].

After the value BL[i] is coded, the register arrays are updated as follows.

S0[$c\_i$, 0]=BL[i],

S0[$c\_i$, 1]=S0[$c\_i$, 0],

S1[$r\_i$, 0]=BL[i],

S1[$r\_i$, 1]=S1[$r\_i$, 0], and

S2[$d\_i$, 0]=BL[i], where d_i=0 if (r_i==c_i), and d_i=2*abs(r_i-c_i)+(r_i<c_i) if (r_i!=c_i).

In defining the index d, the code (r_i<c_i) evaluates to zero when r_i<c_i is false and to one when r_i<c_i is true.

For the first register array S0, the first value S0[$c\_i$, 0] is updated to the value BL[i] that was just coded, and the second value S0[$c\_i$, 1] is updated to the prior value of the first value in the register array (i.e., the value is shifted). For the second register array S1, the first value S1[$r\_i$, 0] is updated to the value BL[i] that was just coded, and the second value S1[$r\_i$, 1] is updated to the prior value of the first value in the register array (i.e., the value is shifted). For the register array S2, the sole value is updated to the value BL[i] that was just coded BL.

Figure 16:
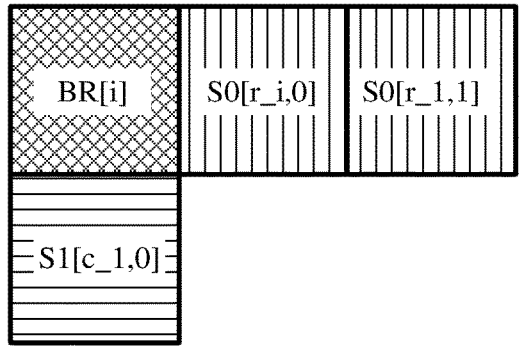
FIG. 16 is a diagram that shows a third example of a register set that corresponds to a horizontal template.
Figure 17:
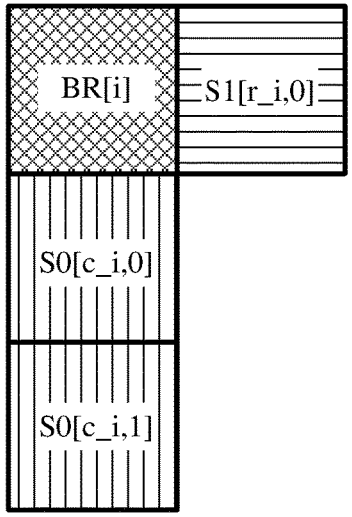
FIG. 17 is a diagram that shows a third example of a register set that corresponds to a vertical template.
Figure 18:
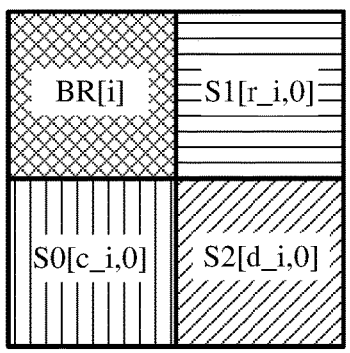
FIG. 18 is a diagram that shows a third example of a register set that corresponds to a two-dimensional template.

A third example in which information needed for context derivation is stored in register sets is shown in FIGS. 16-18. FIG. 16 is a diagram that shows a third example of a register set that corresponds to a horizontal template. FIG. 17 is a diagram that shows a third example of a register set that corresponds to a vertical template. FIG. 18 is a diagram that shows a third example of a register set that corresponds to a two-dimensional template. The example of FIGS. 16-18 uses the second set of spatial neighboring templates of FIG. 9B to derive the contexts for range level symbols (i.e., BR[i]). This implementation avoids accessing previously coded base information, other than the value BR[i] being coded, to update a register set after the value BR[i] is coded. Instead, the values that are not obtained by shifting of other values through the register arrays are based on the value BR[i]. This implementation may be preferable in cases where accessing the base information is costly.

For a transform of size M×N in TX_CLASS_HORIZ, one 8-bit register array may be defined to hold two 4-bit values for each row and one 4-bit register array may defined to hold one 4-bit value for each column to hold values that correspond spatially to the horizontal template 905, with the values to the right of the value being coded stored on a per-row basis, and the value below the value being coded stored on a per-column basis. For a transform of size M×N in TX_CLASS_VERT, one 8-bit register array may be defined to hold two 4-bit values for each column and one 4-bit register array may be defined to hold one 4-bit value for each row, with these register arrays holding values that correspond spatially to the vertical template 906, with the values below the value being coded stored on a per-column basis, and the value to the right of the value being coded stored on a per-row basis. For a transform of size M×N in TX_CLASS_2D, one 4-bit register array may be defined to hold one 4-bit value for each row, one 4-bit register array may be defined to hold one 4-bit value for each column, and one 4-bit register array is defined to hold one 4-bit value for each diagonal to hold values that correspond spatially to the two-dimensional template 907, with the values to the right of the value being coded stored on a per-row basis, the values below the value being coded stored on a per-column basis, and the value diagonally below and to the right of the value being coded stored on a per-diagonal basis. The foregoing examples utilize register arrays that have 4 bits of precision for each value. It should be understood, however, that values of differing precisions could be utilized. It should further be understood that the number of values held in each register array can be changed according to the geometry of a particular spatial template.

For coding a transform block of size M×N determined using TX_CLASS_HORIZ and a context corresponding to the horizontal template 905, a first register array S0 is defined for each row (i.e., for r=0, 1, . . . , N−1), and a second register array S1 is defined for each column (i.e., for c=0, 1, . . . , M−1). The first register array S0 and the second register array S1 are defined respectively as:

S0[$r$, 0], S0[$r$, 1] for r=0, 1, . . . , N−1, and
S1[$c$, 0] for c=0, 1, . . . , M−1.

As shown in FIG. 16, the register array S0 includes values for the same row and to the right of a scan position i of one or more values for the transform coefficient being coded that indicates the magnitude of the transform coefficient, and the register array S1 includes a single value in the same column and one row below the scan position i of the one or more values for the transform coefficient being coded that indicates the magnitude of the transform coefficient. The scan position i is labeled BR[i] here and in FIGS. 17 and 18 because it is the value BR[i] for the transform coefficient at the scan position i that is being coded (i.e., either encoded or decoded) in these examples. Accordingly, the scan position i may be referred to as the position of the value BR[i] being coded herein.

For coding a transform block of size M×N determined using TX_CLASS_VERT and a context corresponding to the vertical template 906, a first register array S0 is defined for each column (i.e., for c=0, 1, . . . , M−1), and a second register array S1 is defined for each row (i.e., for r=0, 1, . . . , N−1). The first register array S0 and the second register array S1 are defined respectively as:

S0[$c$, 0], S0[$c$, 1] for c=0, 1, . . . , M−1, and
S1[$r$, 0] for r=0, 1, . . . , N−1.

As shown in FIG. 17, the register array S0 includes values for the same column and below the position of the value BR[i] being coded, and the register array S1 includes a single value in the same row and one column to the right of the position of the value BR[i] being coded.

For coding a transform block of size M×N determined using TX_CLASS_2D and a context corresponding to the two-dimensional template 907, a first register array S0 is defined for each column (i.e., for c=0, 1, . . . , M−1), a second register array S1 is defined for each row (i.e., for r=0, 1, . . . , N−1), and a third register array S2 is defined for each diagonal. The first register array S0, the second register array S1, and the third register array S2 are defined respectively as:

S0[$c$, 0] for c=0, 1, . . . , M−1,
S1[$r$, 0] for r=0, 1, . . . , N−1, and
S2[$d$, 0] for d=0, 1, M+N−2.

In the foregoing definition of the third register array S2, d is the index of the diagonal line, and can be determined based on the row index [r] and the column index [c] as follows:

d=0, if r is equal to c, and
d=2*abs(r−c)+(r<c), if r is not equal to c.

In defining the index d, the code (r<c) evaluates to zero when r<c is false and to one when r<c is true. Note that any bijective mapping of (r−c) to {0, 1, . . . , M+N−2} can be used to define the index d. In cases where negative indices are allowed, r−c or c−r can be used directly as definition of the index d.

As shown in FIG. 18, the first register array S0 includes values for the same column and below the position of the value BR[i] being coded, the second register array S1 includes values for the same row and to the right of the position of the value BR[i] being coded, and the third register array S2 includes a single value diagonally below and to the right of the position of the value BR[i] being coded.

At the beginning of coding a transform block, the register set is defined according to the transform type that was used to determine the transform coefficients for the transform block. Similar to the description above in regards to FIGS. 10-15, the values in the register arrays of a register set for a current block being encoded or decoded are initially set to a default value (e.g., zero). The value BR[i] for the transform coefficient at scan position i is a value from {0, 1, 2, . . . 12}. The block position corresponding to the scan position i is denoted by row r_i and column c_i. In encoding, the value BR[i] being coded is obtained from base information, such as the level maps. In decoding, the value BR[i] being coded is derived from the encoded bitstream using entropy coding. The context to code the value BR[i] is determined by summing the values from the register arrays, which represent the spatial context neighbors of the position of the value BR[i] according to the template that corresponds to the transform type.

Referring to FIG. 16, if the transform type is one in TX_CLASS_HORIZ, the context used to code the value BL[i] is derived from:

$S0[r\_i, 0]+S0[r\_i, 1]+S1[c\_i, 0]$.

After the value BR[i] is coded, the register arrays are updated as follows:

$S0[r\_i, 0]=BR[i]$,
$S0[r\_i, 1]=S0[r\_i, 0]$, and
$S1[c\_i, 0]=BR[i]$.

For the register array S0, the first value $S0[r\_1, 0]$ is updated to the value BR[i] that was just coded. The remaining value in the register array S0 assumes the value from the preceding value in the register array (i.e., the value in the register array is shifted by one position). For the register array S1, the sole value is updated to the value BR[i] that was just coded.

Referring to FIG. 17, if the transform type is one in TX_CLASS_VERT, the context used to code the value BR[i] is derived from:

$S0[c\_i, 0]+S0[c\_i, 1]+S1[r\_i, 0]$.

After the value BR[i] is coded, the register arrays are updated as follows.

$S0[c\_i, 0]=BR[i]$,
$S0[c\_i, 1]=S0[c\_i, 0]$, and
$S1[r\_i, 0]=BR[i]$.

For the register array S0, the first value $S0[c\_i, 0]$ is updated to the value BR[i] that was just coded. The remaining value in register array S0 assumes the value from the preceding value in the register array (i.e., a value in the register array is shifted by one position). In other words, the register array S0 is updated in a first-in-first-out (FIFO) manner by shifting out the oldest value and adding the value BR[i] as the newest entry. For the register array S1, the sole value is updated to the value BR[i] that was just coded.

If the transform type is one in TX_CLASS_2D, the context used to code the value BR[i] is derived from:

$S0[c\_i, 0]+S1[r\_i, 0]+S2[d\_i, 0]$.

After the value BR[i] is coded, the register arrays are updated as follows.

$S0[c\_i, 0]=BR[i]$,
$S1[r\_i, 0]=BR[i]$, and
$S2[d\_i, 0]=BR[i]$, where
$d\_i=0$ if $(r\_i==c\_i)$, and
$d\_i=2*abs(r\_i-c\_i)+(r\_i<c\_i)$ if $(r\_i!=c\_i)$.

In defining the index d, the code $(r\_i<c\_i)$ evaluates to zero when $r\_i<c\_i$ is false and to one when $r\_i<c\_i$ is true.

For the first register array S0, the sole value $S0[c\_i, 0]$ is updated to the value BR[i] that was just coded. For the second register array S1, the sole value $S1[r\_i, 0]$ is updated to the value BR[i] that was just coded. For the register array S2, the sole value is updated to the value BR[i] that was just coded.

The implementations described with regards to FIGS. 13-18, as mentioned previously, avoids accessing previously coded base information, other than the value BL[i] or BR[i] being coded, to update shift registers after coding. This eliminates the potentially costly access of the base information as compared to the implementation of FIGS. 10-12. In order to further reduce processing, a single register set that is suitable for all transform sizes and scan orders that similarly does not rely on level maps is a desirable variation.

According to such a further implementation, one or more spatial templates used for determining the context neighbors for the quantized transform coefficients may be selected. Selecting the one or more spatial templates may include determining the transform type(s) available to generate the quantized transform coefficients in the transform block that is being coded. That is, the transform types indicate what spatial templates may be used for selecting context neighbors for coding one or more values representing the magnitude of a transform coefficient, here the value BL(i) and optionally the value BR(i). According to the examples described herein, the transform types may be a one-dimensional horizontal transform type, such as one from TX_CLASS_HORIZ, a one-dimensional vertical transform type, such as one from TX_CLASS_VERT, and a two-dimensional transform type, such as one from TX_CLASS_2D. The spatial templates of FIGS. 9A and 9B may be used in this example.

The one or more spatial templates may be used to define the register arrays. In the example where the spatial templates of FIGS. 9A and 9B are available to the transform block being coded, a register set of 5 register arrays are defined to derive context for base level symbols (i.e., BL[i]) and base range symbols (i.e., BR[i]). Defining the register set includes determining the number and sizes of the register arrays that form the register set. The number and sizes of the register arrays may be defined based on the sizes and shapes of the spatial templates and the largest expected size M×N of the transform block. Generally, the cardinality (i.e., the number) of arrays may be equal to the number of context neighbors defined in the spatial templates. The cardinality of the register arrays may comprise one plus a largest number of context neighbors in a row or column of the one or more spatial templates. In the illustrated examples, the largest number of context neighbors along the vertical or horizontal dimension is 4, and the templates 903, 907 include a diagonal context. As a result, the register set includes 5 register arrays.

The largest expected size M×N for a transform block may be used to define sizes of the register arrays. For example the largest dimension of the largest expected size may be used as the number of elements (i.e., context neighbor values) for 4 of the register arrays (where 4 is the largest vertical or horizontal dimension of the spatial templates). In an example where the largest expected size (also referred to as the largest transform size) is 32×32, 4 of the 5 register arrays have 32 elements each. The number of elements (i.e., context neighbor values) of the fifth, final array is based on the expected number of diagonal elements for the largest transform size. In this example, the remaining array has 63 elements in the range {0, 1, . . . , 62} according to R−C+31, where R comprises the row positions of the value BL or BR being coded in the range (0, 1, . . . , 31) and C comprises the column positions of the value BL or BR to be coded in the range (0, 1, . . . , 31). In some cases (e.g., in a software implementation as opposed to a hardware implementation), the remaining array may have 64 elements (more generally, a multiple of 2 elements) instead of 63 elements. More generally, a single register array of the register arrays has a size sufficient to store a number (i.e., a cardinality) of stored values corresponding to a number of values in a diagonal of a largest available transform size and remaining ones of the register arrays have an array size sufficient to store a number of stored values corresponding to a largest dimension of the largest available transform size.

In one example hardware implementation, the five register arrays are defined as follows:

uai4 reg32_0[32],
uai4 reg32_1[32],
uai4 reg32_2[32],
uai4 reg32_3[32], and
uai4 reg64[63].

In the foregoing, uai4 indicates unsigned 4-bit integer type. In a software implementation, uai4 may be replaced by unsigned char or unsigned 8-bit integer type. That is, each element of a register array is sized to support at least one value, where the value is the largest expected value to be coded. In the examples herein, the largest expected value for the value BL is 3 and the largest expected value for the value BR is 12. Accordingly, a 4-bit register array element may be used to store one value, and an 8-bit register array element may be used to store two values.

As with the other implementations described herein, at the beginning of coding a transform unit (or block), the register arrays are initialized to a default value, desirably 0. Deriving or determining the coding contexts used to code one or more values for a transform coefficient that indicate the magnitude of the transform coefficient at scan position i, where (r_i, c_i) denotes the block position corresponding to the scan position i following a given scan order, may be achieved using the defined register set. That is, the coding context may be determined using at least one of the stored values from the register arrays of the register set.

In this example, the register arrays of the register set may be used to compute two magnitude values, mag and br_mag, which are in turn used to derive the coding contexts for the value BL[i] and the value BR[i], respectively. The magnitude values mag and br_mag may be determined based on the transform type of the transform block being coded.

If the transform type is one in TX_CLASS_HORIZ, the magnitude values may be determined according to the following pseudocode:

mag=MIN(reg32_0[r_i], uai4(3))+MIN(reg32_1[r_i], uai4(3))+MIN(reg32_2[r_i], uai4(3))+MIN(reg32_3[r_i], uai4(3))+MIN(reg64[c_i], uai4(3)); and
    br_mag=reg32_0[r_i]+reg32_1[r_i]+reg64[c_i];
    mag=MIN((mag+1)>>1, 4);
    br_mag=MIN((br_mag+1)>>1, 6).

The function reg32_0[r_i] returns the value in the first register array reg32_0 at the array position corresponding to the row r_i, the function reg32_1[r_i] returns the value in the second register array reg32_1 at the array position corresponding to the row value r_i, the function reg32_2[r_i] returns the value in the third register array reg32_2 at the array position corresponding to the row value r_i, and the function reg32_3[r_i] returns the value in the fourth register array reg32_3 at the array position corresponding to the row value r_i. Similarly, the function reg64[c_i] returns the value in the fifth register array reg64 at the array position corresponding to the column value c_i. For example, if the scan position i is at the block position (4, 0), the value at array position 4 in each of the first register array reg32_0, the second register array reg32_1, the third register array reg32_2, and the fourth register array reg32_3 is returned by the function reg32_0[r_i], the function reg32_1[r_i], the function reg32_2[r_i], and the function reg32_3[r_i] respectively. Similarly, the function reg64[c_i] returns the value at array position 0 in the fifth register array reg64.

The function uai4(3) returns the binary value for 3 in 4 bits, namely 0011. The value 3 is used because it is the highest value for BL, and is hence the highest value for the context neighbors of BL(i). In alternative implementations, this value may be different. The function MIN(a, b) returns the smaller value between a and b. The function operator ">>" right-shifts a value by a designated number of bits, here 1 bit). The calculations mag=MIN((mag+1)>>1, 4), and br_mag=MIN((br_mag+1)>>1, 6) normalize the magnitude values for the different transform types.

Using the same example as described above, and immediately after initialization (e.g., such that all values in the arrays are 0), the magnitude value mag is calculated as follows:

mag=MIN(0, 0011)+MIN(0, 0011)+MIN(0, 0011)+MIN(0, 0011)+MIN(0, 0011)=0;
    mag=MIN((0+1)>>1, 4);
    mag=MIN(0, 4); and
    mag=0; and the magnitude value br_mag is calculated as follows:

br_mag=0+0+0=0;
    br_mag=MIN((0+1)>>1, 6);
    br_mag=MIN(0, 6); and
    br_mag=0.

If the transform type is one in TX_CLASS_VERT, the magnitude values may be determined according to the following pseudocode:

mag=MIN(reg32_0[c_i], uai4(3))+MIN(reg32_1[c_i], uai4(3))+MIN(reg32_2[c_i], uai4(3))+MIN(reg32_3[c_i], uai4(3))+MIN(reg64[r_i], uai4(3));
    br_mag=reg32_0[c_i]+reg32_1[c_i]+reg64[r_i];
    mag=MIN((mag+1)>>1, 4);
    br_mag=MIN((br_mag+1)>>1, 6).

The function reg32_0[c_i] returns the value in the first register array reg32_0 at the array position corresponding to the column value c_i, the function reg32_1[c_i] returns the value in the second register array reg32_1 at the array position corresponding to the column value c_i, the function reg32_2[c_i] returns the value in the third register array reg32_2 at the array position corresponding to the column value c_i, and the function reg32_3[c_i] returns the value in the fourth register array reg32_3 at the array position corresponding to the column value c_i. Similarly, the function reg64[r_i] returns the value in the fifth register array reg64 at the array position corresponding to the row value r_i. For example, if the scan position i is at the block position (6, 2), the value at array position 6 (e.g., the seventh value) in each of the first register array reg32_0, the second register array reg32_1, the third register array reg32_2, and the fourth register array reg32_3 is returned by the function reg32_0[c_i], the function reg32_1[c_i], the function reg32_2[c_i], and the function reg32_3[c_i] respectively. Similarly, the function reg64[r_i] returns the value at array position 2 (e.g., the third value) in the fifth register array reg64.

Using the example where the block position of the values BL[i] and BR[i] being coded is (6, 2), and assuming that the values at reg32_0[c_i]=reg32_0[2]=4 and reg32_1[c_i]=reg32_1[2]=4, and the values at the remaining array positions have a value of 0, the magnitude value mag is calculated as follows:

mag=MIN(0100, 0011)+MIN(0100, 0011)+MIN(0, 0011)+MIN(0, 0011)+MIN(0, 0011);
    mag=0011+0011+0+0+0=0110;
    mag=MIN((0110+1)>>1, 4);
    mag=MIN(0111>>1, 4);
    mag=MIN(0011, 4); and
    mag=0011=3; and the magnitude value br_mag is calculated as follows:

br_mag=0100+0100+0=1000;
    br_mag=MIN((1000+1)>>1, 6);
    br_mag=MIN((1001)>>1, 6);
    br_mag=MIN(0100, 6); and
    br_mag=0100=4.

If the transform type is one in TX_CLASS_2D, the magnitude values may be determined according to the following pseudocode:

mag=MIN(reg32_0[c_i], uai4(3))+MIN(reg32_1[c_i], uai4(3))+MIN(reg32_2[r_i], uai4(3))+MIN(reg32_3[r_i], uai4(3))+MIN(reg64[diag], uai4(3));
br_mag=reg32_0[c_i]+reg32_2[r_i]+reg64[diag];
mag=MIN((mag+1)>>1, 4);
br_mag=MIN((br_mag+1)>>1, 6).

In the foregoing, diag=r_i−c_i+31, and is the index for the fifth register array reg64. Accordingly, the function reg64[diag] returns the value in the fifth register array at the array position corresponding to the index value diag. The calculations are performed similarly to those where the transform type is one in TX_CLASS_HORIZ or TX_CLASS_VERT.

Summarizing the above, determining the coding context using at least some of the stored values includes determining, based on a transform type used for the transform block, a respective index for each of the register arrays using a column and/or a row of the scan position. A stored value from each of the register arrays to determine the coding context is then selected using a respective index of each of the register arrays. Selected stored values from each of the register arrays are summed to generate a first magnitude value (e.g., mag), while limiting each of the selected stored values to a first maximum value (e.g., 3) while summing. Then, the first magnitude value is normalized. Similarly, a stored values from fewer that each of the register arrays are summed to generate a second magnitude value (e.g., br_mag). Then, the second magnitude value is normalized. Subsequently, and as described below, a first coding context for entropy coding a first value for the transform coefficient (e.g., BL[i]) indicative of a magnitude of the transform coefficient that is no greater than the first maximum value (e.g., 3) may be determined using the normalized first magnitude value, and a second coding context for entropy coding a second value (e.g., BR[i]) for the transform coefficient indicative of the magnitude of the transform coefficient that is up to a second maximum value (e.g., 12) is determined using the normalized second magnitude value.

Once the magnitude value mag is obtained, a context offset ctx_offset used to code the value BL[i] may be determined, also based on the transform type. If the transform type is one in TX_CLASS_2D, the following pseudocode may be used to determine ctx_offset:
if (r_i==0 && c_i==0) ctx_offset=0;
else if (w<h && r_i<2) ctx_offset=11+mag;
else if (w>h && c_i<2) ctx_offset=16+mag;
else if (r_i+c_i<2) ctx_offset=mag+1;
else if (r_i+c_i<4) ctx_offset=5+mag+1;
else ctx_offset=21+mag.

Herein, w is the width of the transform block being coded, h is the height of the transform block being coded, == is a Boolean operator such that (a==b) evaluates to true when a=b and otherwise evaluates to false, and && is a Boolean operator such that (a && b) evaluates to true when a and b are true and evaluates to false when either a or b is false. Accordingly, the value of ctx_offset is based on the value of r_i and c_i. The value of ctx_offset is based on the width and height of the transform block being coded. If r_i and c_i are both equal to 0, ctx_offset is equal to zero. If r_i or c_i or both are not equal to 0, the remaining conditions are considered in order. Once a value is determined for ctx_offset in response to a condition, further processing of the conditions ends. For example, if w is less than h, but r_i is not less than 2, the next condition (i.e., whether (w>h && c_i<2) evaluates to true) is considered. On the other hand, if w is less than h, and r_i is less than 2, ctx_offset is equal to 11+mag. The next condition (i.e., whether (w>h && c_i<2) evaluates to true) is not considered, nor are the subsequent conditions.

If the transform type is one in TX_CLASS_VERT, the following pseudocode may be used to determine ctx_offset:
if (r_i==0) ctx_offset=26+mag;
else if (r_i<2) ctx_offset=26+5+mag;
else ctx_offset=26+10+mag.

If the transform type is one in TX_CLASS_HORIZ, the following pseudocode may be used to determine ctx_offset:
if (c_i==0) ctx_offset=26+mag;
else if (c_i<2) ctx_offset=26+5+mag;
else ctx_offset=26+10+mag.

Once the magnitude value br_mag is obtained, a context offset br_ctx_offset used to code BR[i] may be determined. If r_i and c_i are both equal to zero, the context coefficient br_ctx_offset is set equal to the magnitude value br_mag. Otherwise, the context coefficient br_ctx_offset is based on the transform type. If the transform type is one in TX_CLASS_2D, the context coefficient br_ctx_offset is set to br_mag+7 if r_i and c_i are both less than 2. Otherwise, the context coefficient br_ctx_offset is set to br_mag+14. If the transform type is one in TX_CLASS_HORIZ, the context coefficient br_ctx_offset is set to br_mag+7 if c_i is equal to 0. Otherwise, the context coefficient br_ctx_offset is set to br_mag+14. Finally, if the transform type is one in TX_CLASS_VERT, the context coefficient br_ctx_offset is set to br_mag+7 if r_i is equal to 0. Otherwise, the context coefficient br_ctx_offset is set to br_mag+14.

The context offset ctx_offset is used, along with other information like transform size and whether the transform block is a luma or chroma block, to determine a context for the value BL[i]. As is conventional, a context specifies the probability distribution used in arithmetic coding. In the case for the value BL[i], the probability distribution is a 4-tuple. On the encoder side, arithmetic encoding codes the value BL[i] into a binary codeword by using the probability distribution given by the context. On the decoder side, arithmetic decoding decodes the value BL[i] from a binary codeword and the probability distribution. The context offset br_ctx_offset is similarly used to determine a context for the value BR[i].

After the values BL[i] and BR[i] are coded, the register arrays are updated to prepare for context derivation at scan position i−1 if i>0. In the following, level=BL[i] if BL[i]<3, and level=3+BR[i] if BL[i]=3. The register arrays may be updated as shown in the following pseudocode depending upon the transform type of the transform block:
where the transform type is one in TX_CLASS_HORIZ:
reg32_3[r_i]=reg32_2[r_i];
reg32_2[r_i]=reg32_1[r_i];
reg32_1[r_i]=reg32_0[r_i];
reg32_0[r_i]=level;
reg64[c_i]=level;
where the transform type is one in TX_CLASS_VERT:
reg32_3[c_i]=reg32_2[c_i];
reg32_2[c_i]=reg32_1[c_i];
reg32_1[c_i]=reg32_0[c_i];
reg32_0[c_i]=level;
reg64[r_i]=level;
where the transform type is one in TX_CLASS_2D:
reg32_1[c_i]=reg32_0[c_i];
reg32_0[c_i]=level;
reg32_3[r_i]=reg32_2[r_i];
reg32_2[r_i]=level;
reg64[diag]=level.

In summary, where the transform type is one of TX_CLASS_HORIZ, the values in the first register array at position r_i reg32_0[r_i] and the fifth register array at position c_i reg64[c_i] are updated to level, which value is based on the value BL[i] that was just coded as described above. The value in the second register array at position r_i reg32_1[r_i] is updated to the value in the first register array at position r_i reg32_0[r_i]. The remaining values in the remaining register arrays at position r_i assume the values from the preceding register array at position r_i. That is, values in the register array are shifted by one array position. In the implementations previously described, the array position shift is a shift in position within an array. In this implementation, the array position shift is a shift in position between arrays.

Similarly, where the transform type is one of TX_CLASS_VERT, the values in the first register array at position c_i reg32_0[c_i] and the fifth register array at position r_i reg64[r_i] are updated to level, which value is based on the value at the position that was just coded BL[i] as described above. The value in the second register array at position c_i reg32_1[c_i] is updated to the value in the first register array at position c_i reg32_0[r_i]. The remaining values in the remaining register arrays at position c_i assume the values from the preceding register array at position c_i (i.e., values in the register array are shifted by one array position).

Finally, where the transform type is one of TX_CLASS_2D, the values in the first register array at position c_i reg32_0[c_i], the third register array at position r_i, and the fifth register array at position diag reg64[diag] are updated to level, which value is based on the value BL[i] that was just coded as described above. The value in the second register array at position c_i reg32_1[c_i] is updated to the value in the first register array at position c_i reg32_0 [r_i]. The remaining value in the fourth register array at position r_i assumes the value from the preceding (third) register array at position r_i reg32_2[r_i]. As with the other transform types, values in the register array are shifted by one array position.

Note that this solution may be described as universal in the sense that it can be applied to any transform size and any scan order. With this solution, there is also no need to pad a transform (to the right and below) to derive contexts for symbols at the right and bottom boundary of a transform as needed in storing neighborhood positions—padding is replaced by simply initializing the arrays to 0.

Figure 19:
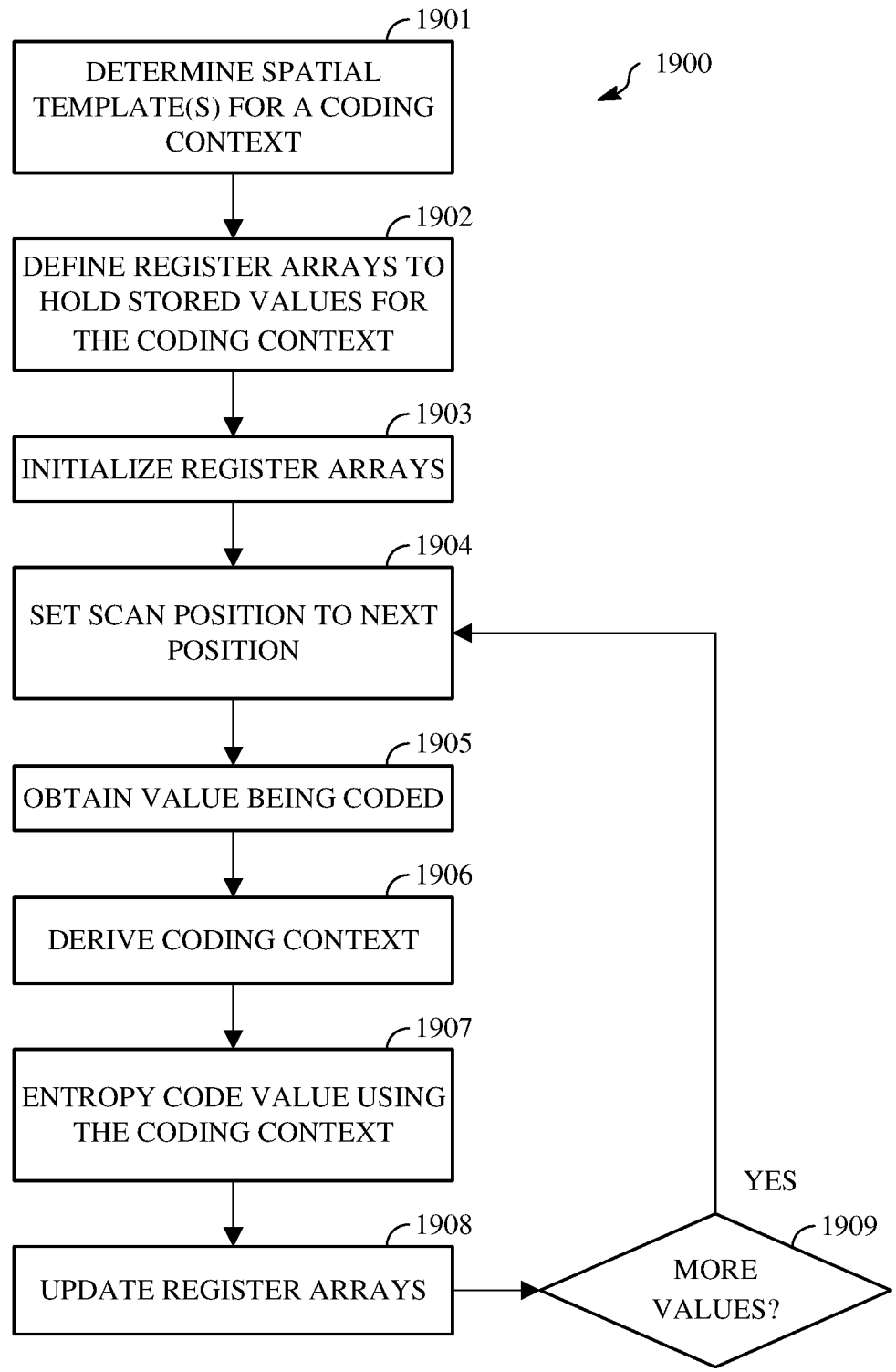
FIG. 19 is a flowchart diagram of a process for coding a transform block according to an implementation of this disclosure.

FIG. 19 is a flowchart diagram of a process for coding a transform block according to an implementation of this disclosure. The process 1900 can be implemented in an encoder such as the encoder 400. In an implementation, the process 1900 is utilized in the process 800, for example, to implement coding of the value BL[i] in operation 802, the coding of the value BR[i] in operation 803, or both.

The process 1900 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 1900. In at least some implementations, the process 1900 can be performed in whole or in part by the entropy encoding stage 408 of the encoder 400.

The process 1900 can be implemented using specialized hardware or firmware. Some computing devices can have multiple memories, multiple processors, or both. The steps or operations of the process 1900 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 1900 can receive information that describes the magnitudes of transform coefficients. For example, the process 1900 can receive a transform block, such as the transform block 704, or level maps that represent values from the transform block 704, such as the non-zero map 708, the level-1 map 712, and the level-2 map 714.

In operation 1901, one or more spatial templates for a coding context may be determined or selected. This determination can be made based on the transform type that was used to determine the quantized transform coefficients in the transform block that is being coded. The spatial templates are spatial arrangements of cells, anchored at the value being coded at the current scan position, from which the coding context is determined. The templates may be horizontal, vertical, or two-dimensional templates, selected on the basis of use of a one-dimensional horizontal transform type, such as one from TX_CLASS_HORIZ, a one-dimensional vertical transform type, such as one from TX_CLASS_VERT, or a two-dimensional transform type, such as one from TX_CLASS_2D, respectively. Thus, each of a plurality of differently transform types may correspond to selection of a different spatial template. Examples of spatial templates that can be selected in operation 1901 include the horizontal templates 901, 905, the vertical template 902, 906, and the two-dimensional template 903, 907.

In some implementations, the spatial template for the coding context corresponds to an area that includes positions from at least two rows and positions from at least two columns, and a top-left position of the spatial template corresponds to the scan position. The transform type may be a horizontal transform type, a vertical transform type, a two-dimensional transform type, or any combination thereof.

In implementations such as those described with regard to FIGS. 10-18, only one template may be selected for each of the determination of a context for coding the value BL, and where applicable the value BR. In an implementation such as the universal solution described above, all available templates may be selected. According to a variation in this implementation, all available templates for only the transform type may be selected. The selection of one or more templates at 1901 may be omitted where, for example all available templates are used, as the templates may be known a priori.

A spatial template determined in operation 1901 may include plural values from a same row as the scan position and a single value from a same column as the scan position when the transform type is the horizontal transform type. A spatial template selected in operation 1901 may include plural values from a same column as the scan position and a single value from a same row as the scan position when the transform type is the vertical transform type. A spatial template selected in operation 1901 may include plural values from a same column as the scan position, plural values from a same row as the scan position, and a single value from a same diagonal as the scan position when the transform type is the two-dimensional transform type.

In operation 1902, register arrays are defined to hold values for the coding context. The values held in the register arrays may be referred to herein as stored values. The register arrays are defined based on, at least in part, the geometry of the spatial template(s) selected in operation 1901. For example, the values in the register arrays may each correspond to a position in the spatial template selected in operation 1901. By defining the register arrays to correspond to a geometric arrangement of the spatial template, the stored values from the register arrays will each correspond to a respective position from the spatial template, and a particular value in each register array position will therefore correspond to a particular spatial location within the spatial template. The values for the spatial template are stored in two or more register arrays, which each can hold values for a single row, column, or diagonal of the spatial template. The register arrays may each correspond to a column index, a row index, or a diagonal index of the transform block. The register arrays can be defined, for example, as described with reference to the examples shown in FIGS. 10-18.

The register arrays may be defined at operation 1902 based on the geometry of the spatial templates and based on the largest available transform size. As described previously, the largest available transform size may be 32×32. The cardinality or number of register arrays may be defined by an array that has a size sufficient to store a number of values corresponding to the largest number of values in a diagonal of the largest available transform size and a number of arrays that correspond to the larger number of the largest number of columns or the largest number of rows of the spatial templates determined at 1901, where each of the latter register arrays has an array size sufficient to store a number of values corresponding to the larger of the largest number of columns or the largest number of rows of the largest available transform size. In an example where the largest available transform size is 32×32, and the largest number of columns and the largest number of rows in the spatial templates are both equal to 4, there are five register arrays—4 having an array size (number of elements) of 32, and one having an array size of 63 (or 64 where processing makes an array size of $2^n$ desirable).

In operation 1903, the register arrays are initialized. Initializing the register arrays can include setting all of the values in the register arrays to a default value, such as zero.

In operation 1904, entropy coding of values for transform coefficients indicative of magnitudes of the transform coefficients from the transform block begins by setting the scan position to a next position to be coded, referred to herein as the scan position i. Various scan orders may be used for predicting a block that is used to produce the transform block. Entropy coding is performed using the reverse of this scan order (referred to herein as a reverse scan order). Therefore, the first position to be coded corresponds to the first non-zero value that appears in the reverse scan order. In subsequent iterations, the scan position is decremented in operation 1904, such that operations 1905-1908 are performed again, which continues until all of the values from the transform block are coded.

In operation 1905, a value for the transform coefficient being coded is obtained. The value is indicative of a magnitude of the transform coefficient at the current scan position i within the current transform block being coded. The value may be obtained from the transform block 704 and/or from level maps that represent the transform block. For example, the value being coded may be a single value corresponding to BL or BR, or may be two values corresponding to BL and BR.

In operation 1906, the coding context is determined using the values from the register arrays. As an example, the coding context may be determined by summing values from the register arrays, as described with reference to FIGS. 10-18. In the further example such as that described above, the coding context for BL may be determined by summing values from the register arrays after those values are compared to the highest value for BL. The lower values from each of the comparisons are summed, and used to generate a magnitude value mag that is used to generate the coding context, a context offset ctx_offset. The coding context for BR may be determined by summing values from fewer than all of the register arrays, which sum is then used to generate a magnitude value br_mag for generating the coding context, a context offset br_ctx_offset. The coding contexts ctx_offset and br_ctx_offset also depend upon the scan position (r_i, c_i, or both). When the transform type is one in TX_CLASS_2D, the coding context ctx_offset may also depend upon the dimensions of the transform block (the width, the height, or both).

In some implementations, in operation 1906, determining the coding context using the stored values from the register arrays includes selecting one or more register array positions that correspond to one of the column index, the row index, or the diagonal index for the scan position.

Operation 1907 includes entropy coding the one or more values (BL, BR, or both) using the coding context that was determined in operation 1906. In particular, the coding context is used to select a statistical model for use in entropy coding, which is then performed, for example, as described with respect to the entropy encoding stage 408 of the encoder 400. The output of operation 1907 may be inserted into an encoded bitstream.

Subsequent to entropy coding the value in operation 1907, at least some of the stored values in the register arrays are updated in operation 1908. Updating at least some of the stored values in the register arrays may include shifting one or more values by one register array position. This shifting may occur between register array positions within a single register array. The shifting may occur between register array positions of two register arrays. The register array positions of the two register arrays may be the same position (e.g., a common index or the same register index) in the two register arrays. That is, for example, shifting one or more stored values may comprise shifting the one or more stored values from an array position at an index within a first register array to an array position at a common index within a second register array.

Updating at least some of the stored values in the register arrays may include setting one or more values in the register arrays equal to the value that was coded in operation 1907. Where a single set of register arrays are used to determine a coding context for both values BL[i] and BR[i] at scan position i, updating at least some of the stored values in the register arrays may include setting one or more values in the register arrays equal to the value BL[i] that was coded in operation 1907 as long as the value BL[i] is less than the maximum value for BL[i] (e.g., 3) and otherwise setting the one or more values in the register arrays equal to the value BR[i] plus the maximum value for the value BL[i].

In some implementations, updating at least some of the stored values in the shift registers includes obtaining information from the values indicative of the magnitudes of the transform coefficients from the transform block. These values (like the values BL and BR) may be the transform coefficient values themselves, absolute values of the transform coefficients, and/or values from level maps. The values may be numbers or may be expressions, such as Boolean expressions. For example, the values can indicate whether the absolute value of each transform coefficient is equal to zero, equal to one, equal to two, or is greater than or equal to three.

In operation 1909, a determination is made as to whether more values remain to be coded. For example, if the most recent operation of 1907 coded scan position i=0, it can be determined that no more values remain to be coded, and the process 1900 ends for the current transform block. Otherwise, the process returns to operation 1904, where the scan position is set to the next position in the reverse scan order, and operations 1905 through 1909 are performed again for value of the new scan position. The process 1900 may be repeated for multiple transform blocks of a frame.

Figure 20:
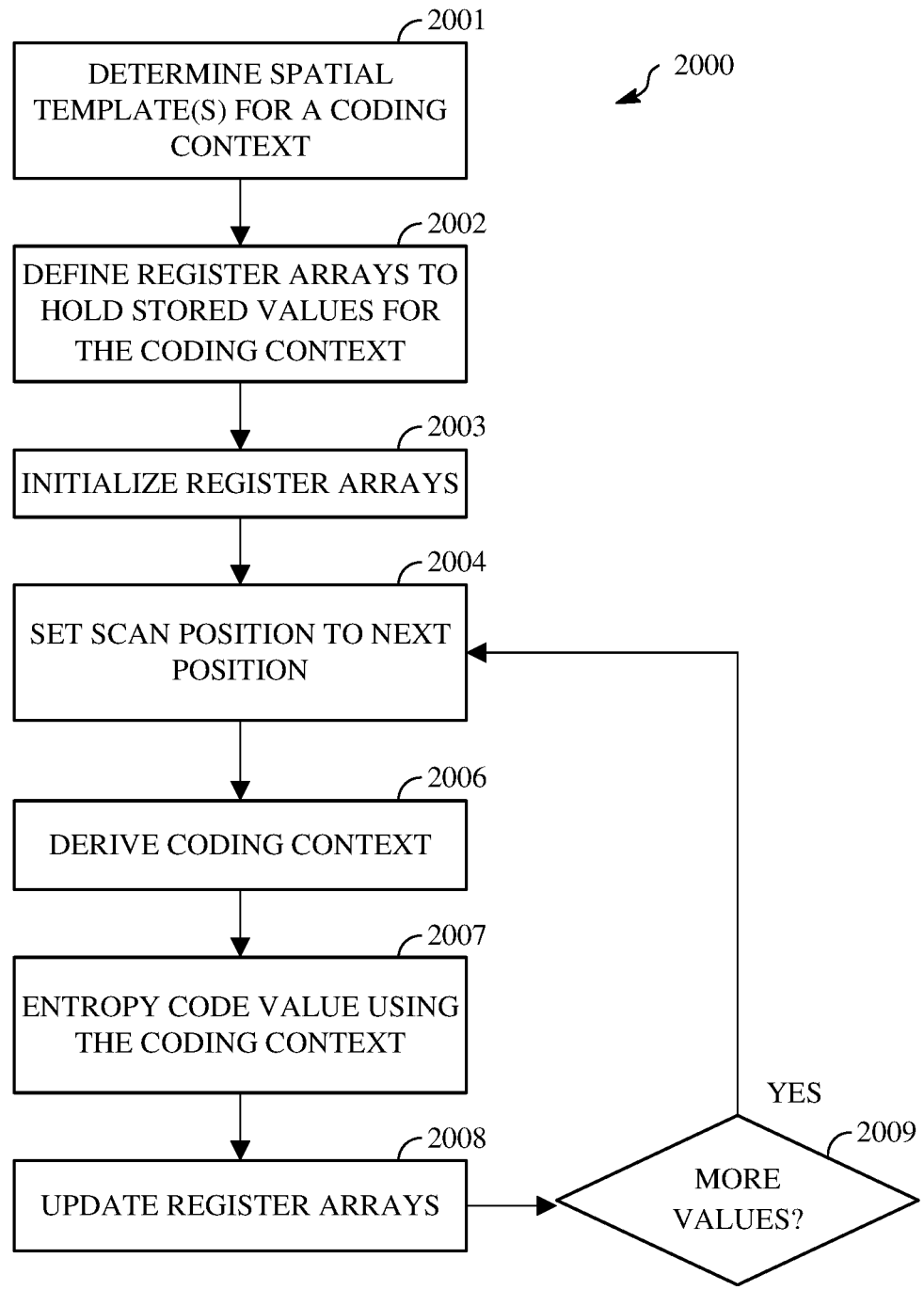
FIG. 20 is a flowchart diagram of another process for coding a transform block according to an implementation of this disclosure.

As is clear from the description of operations 1905 and 1907, the process 1900 may be used for entropy encoding transform coefficients of a transform block. FIG. 20 is a flowchart diagram of a process for coding a transform block according to another implementation of this disclosure. The process 2000 can be implemented in a decoder such as the decoder 500. In an implementation, the process 2000 is utilized in the process 800, for example, to implement coding of the value BL[i] in operation 802, the coding of the value BR[i] in operation 803, or both.

The process 2000 can be implemented, for example, as a software program that can be executed by computing devices such as receiving station 106. The software program can include machine-readable instructions that can be stored in a memory such as the memory 204 or the secondary storage 214, and that can be executed by a processor, such as CPU 202, to cause the computing device to perform the process 2000. In at least some implementations, the process 1900 can be performed in whole or in part by the entropy decoding stage 502 of the decoder 500.

The process 2000 can be implemented using specialized hardware or firmware. Some computing devices can have multiple memories, multiple processors, or both. The steps or operations of the process 2000 can be distributed using different processors, memories, or both.

The process 2000 can receive information that describes the magnitudes of transform coefficients. For example, the process 2000 can receive a portion of an encoded bitstream that includes an encoded transform block, such as the transform block 704, or encoded level maps that represent values from the transform block 704, such as the non-zero map 708, the level-1 map 712, and the level-2 map 714.

In operation 2001, one or more spatial templates for a coding context are determined or selected. The operation 2001 may be the same as the operation 1901 described above.

In operation 2002, register arrays are defined to hold stored values for the coding context. The operation 2002 may be the same as the operation 1902 described above.

In operation 2003, the register arrays are initialized. Initializing the register arrays can include setting all of the values in the register arrays to a default value, such as zero, as described above with regard to operation 1903.

In operation 2004, entropy coding of values for transform coefficients indicative of magnitudes of the transform coefficients from the transform block begins by setting the scan position to the next position (e.g., in reverse scan order starting at the first non-zero value as described with regard to operation 1904.

In operation 2006, the coding context is determined using the values from the register arrays. The operation 2006 may be the same as the operation 1906 described above.

Operation 2007 includes entropy coding the one or more values (BL, BR, or both) for the transform coefficient at the scan position i set at operation 2004. Entropy coding is performed using the coding context that was determined in operation 2006 with the encoded bitstream, such as the compressed bitstream 420, as input. The coding context, together with other information such as transform block size, prediction mode, etc., is used to select a statistical model for use in entropy coding. Entropy coding may be performed, for example, as described with respect to the entropy decoding stage 502 of the encoder 400. The output of operation 2007 is the value or values for the transform coefficient at the scan position i. For example, the process 2000 may be used to code the values BL and BR as described in operation 802 and 803, which values are then combined to produce the transform coefficient once the process 800 is completed for a transform coefficient.

Subsequent to entropy coding the one or more values for the transform coefficient in operation 2007, at least some of the stored values in the register arrays are updated in operation 2008. Updating at least some of the stored values in the register arrays in operation 2008 may be performed the same as the updating in operation 1908 described above.

In operation 2009, a determination is made as to whether more values remain to be coded. For example, if the most recent operation of 2007 coded values at scan position i=0, the process 2000 ends for the current transform block. Otherwise, the process 2000 returns to operation 2004, where the scan position is set to the next position in the reverse scan order. Operations 2006 through 2009 are performed again for values of transform coefficients of the new scan position. The process 2000 may be repeated for multiple transform blocks of a frame.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method of coding a transform block having transform coefficients, comprising:
    defining, based on at least one spatial template for a coding context, register arrays to each hold one or more stored values regarding the coding context, wherein the register arrays include at least a first register array that has a first size and a second register array that has a second size that is different than the first size;
    initializing the register arrays by setting the stored values to default values; and
    coding, in a reverse scan order, values for the transform coefficients from the transform block that are indicative of magnitudes of the transform coefficients, the coding including, for each of one or more transform coefficients:
        determining the coding context using at least some of the stored values from the register arrays,
        entropy coding a value for the transform coefficient at a scan position using the coding context, and
        subsequent to entropy coding the value for the transform coefficient, updating the register arrays.

2. The method of claim 1, wherein:
    a cardinality of the register arrays comprises one plus a largest number of context neighbors in a row or column of the at least one spatial template; and
    the register arrays comprise:
    a single register array of the register arrays having an array size sufficient to store a number of stored values corresponding to a number of values in a diagonal of a largest available transform size; and
    remaining ones of the register arrays having an array size sufficient to store a number of stored values corresponding to a largest dimension of the largest available transform size.

3. The method of claim 2, wherein:
    the cardinality of the register arrays is 5;
    the single register array has an array size that stores at least 63 values; and
    the remaining ones of the register arrays each have an array size that stores 32 values.

4. The method of claim 1, further comprising:
    selecting, based on a transform type used for the transform block, the at least one spatial template for the coding context, wherein the at least one spatial template comprises a first spatial template for a first value at the scan position indicative of a magnitude of a current transform coefficient of the transform block and a second spatial template for a second value at the scan position indicative of the magnitude of the current transform coefficient, the first spatial template different from the second spatial template, and wherein:
    entropy coding the value for the transform coefficient comprises entropy coding the first value and entropy coding the second value, wherein entropy coding the first value uses a different coding context than entropy coding the second value.

5. The method of claim 4, wherein the first value is less than or equal to a first maximum value for the magnitude, and the second value is less than or equal to a second maximum value, the first maximum value less than the second maximum value.

6. The method of claim 1, wherein the register arrays correspond to a geometric arrangement of the at least one spatial template, such that the stored values from the register arrays each correspond to a respective position from the at least one spatial template.

7. The method of claim 1, wherein the register arrays comprise a set of register arrays, and determining the coding context comprises determining two coding contexts using the set of register arrays, each of the two coding contexts for entropy coding a respective value for the transform coefficient at the scan position.

8. The method of claim 1, wherein updating the register arrays includes shifting one or more stored values by one array position.

9. The method of claim 8, wherein shifting one or more stored values by one array position comprises shifting the one or more stored values by one array position within a single register array of the register arrays.

10. The method of claim 8, wherein shifting one or more stored values by one array position comprises shifting the one or more stored values from an array position at an index within a first register array to an array position at a common index within a second register array.

11. An apparatus for coding a transform block having transform coefficients, comprising:

a memory; and a processor configured to execute instructions stored in the memory to:

define, based on at least one spatial template for a coding context, register arrays to each hold one or more stored values regarding the coding context, wherein the register arrays include at least a first register array that has a first size and a second register array that has a second size that is different than the first size;

initialize the register arrays by setting the stored values to default values; and code, in a reverse scan order, values for the transform coefficients from the transform block that are indicative of magnitudes of the transform coefficients, wherein the instructions to code include instructions to, for each of one or more transform coefficients:

determine the coding context using at least some of the stored values from the register arrays, entropy code a value for the transform coefficient at a scan position using the coding context, and subsequent to entropy coding the value for the transform coefficient, update the register arrays.

12. The apparatus of claim 11, wherein instructions to update the register arrays includes setting one or more stored values in the register arrays equal to the value for the transform coefficient.

13. The apparatus of claim 11, wherein the instructions for entropy coding the value comprise instructions to:

entropy code a first value indicative of a magnitude of the transform coefficient, the first value belonging to a set of positive integers {0, . . . , a first maximum value}, and entropy code a second value indicative of the magnitude of the transform coefficient, the second value belonging to a set of positive integers {0, . . . , a second maximum value}, and the second maximum value is greater than the first maximum value; and wherein instructions to update at least some of the stored values in the register arrays includes:

setting one or more values in the register arrays equal to the first value when the first value is less than the first maximum value, and otherwise setting the one or more values in the register arrays equal to a sum of the first value and the second value.

14. The apparatus of claim 11, wherein the instructions to determine the coding context using at least some of the stored values from the register arrays comprises instructions to:

determine, based on a transform type used for the transform block, a respective index for each of the register arrays using at least one of a column and a row of the scan position; and select, from each of the register arrays using its respective index, a stored value to determine the coding context.

15. The apparatus of claim 14, wherein the instructions to determine the coding context using at least some of the stored values from the register arrays comprises instructions to:

sum selected stored values from each of the register arrays to generate a first magnitude value, wherein each selected stored value is limited to a first maximum value while summing;

normalize the first magnitude value;

determine, using the normalized first magnitude value, a first coding context for entropy coding a first value for the transform coefficient indicative of a magnitude of the transform coefficient that is no greater than the first maximum value;

sum selected stored values from fewer than all of the register arrays to generate a second magnitude value;

normalize the second magnitude value; and determine, using the normalized second magnitude value, a second coding context for entropy coding a second value for the transform coefficient indicative of the magnitude of the transform coefficient that is up to a second maximum value.

16. An apparatus for coding a transform block having transform coefficients, comprising:

a memory; and a processor configured to execute instructions stored in the memory to:

define, based on at least one spatial template for a coding context, register arrays to each hold one or more stored values regarding the coding context;

initialize the register arrays by setting the stored values to default values; and code values, in a reverse scan order, for the transform coefficients of the transform block indicative of magnitudes of the transform coefficients, including instructions to:

determine a first coding context using at least some of the stored values from the register arrays, entropy code a first value for the transform coefficient using the first coding context, the first value indicative of a magnitude of the transform coefficient, and the first value belonging to a set of positive integers {0, . . . , a first maximum value}, determine a second coding context using at least some of the stored values from the register arrays, entropy code a second value for the transform coefficient using the second coding context, the second value indicative of the magnitude of the transform coefficient, the second value belonging to a set of positive integers {0, . . . , a second maximum value}, and the second maximum value greater than the first maximum value, and subsequent to entropy coding the first value and the second value, update the register arrays.

17. The apparatus of claim 16, wherein the instructions to determine the first coding context comprises instructions to:

sum respective stored values from each of the register arrays to generate a first magnitude value, wherein each stored value is limited to a first maximum value while summing;

normalize the first magnitude value; and determine, using the normalized first magnitude value, the first coding context; and wherein the instructions to determine the first coding context comprises instructions to:

sum respective stored values from fewer than all of the register arrays to generate a second magnitude value;

normalize the second magnitude value; and determine, using the normalized second magnitude value, the second coding context.

18. The apparatus of claim 16, wherein:

a cardinality of the register arrays comprises one plus a number that corresponds to a larger number of a largest number of columns or a largest number of rows of the at least one spatial template; and the register arrays comprise:

a single register array of the register arrays having an array size sufficient to store a number of stored values corresponding to a number of values in a diagonal of a largest available transform size; and remaining ones of the register arrays having an array size sufficient to store a number of stored values corresponding to a largest dimension of the largest available transform size.

19. The apparatus of claim 16, wherein the instructions to update the register arrays comprises instructions to:

shift one or more stored values from an array position at an index within a first register array to an array position at a common index within a second register array; and set one or more stored values in the register arrays equal to the first value when the first value is less than the first maximum value, and otherwise setting the one or more stored values in the register arrays equal to a sum of the first value and the second value.

* * * * *